(12) United States Patent
Ba et al.

(10) Patent No.: US 11,969,899 B2
(45) Date of Patent: Apr. 30, 2024

(54) METHOD FOR GENERATING NOVEL IMPEDANCE CONFIGURATION FOR THREE-DEGREE-OF-FREEDOM (3DOF) ROBOTIC LEG

(71) Applicant: Yanshan University, Hebei (CN)

(72) Inventors: Kaixian Ba, Hebei (CN); Yanhe Song, Hebei (CN); Huashun Li, Hebei (CN); Bin Yu, Hebei (CN); Guoliang Ma, Hebei (CN); Yuan Wang, Hebei (CN); Xiangdong Kong, Hebei (CN)

(73) Assignee: Yanshan University, Hebei (CN)

( * ) Notice: Subject to any disclaimer, the term of this patent is extended or adjusted under 35 U.S.C. 154(b) by 404 days.

(21) Appl. No.: 17/198,844

(22) Filed: Mar. 11, 2021

(65) Prior Publication Data

US 2022/0134560 A1 May 5, 2022
US 2023/0148455 A9 May 11, 2023

(30) Foreign Application Priority Data

Oct. 29, 2020 (CN) .......................... 202011179099.8

(51) Int. Cl.
B25J 9/16 (2006.01)

(52) U.S. Cl.
CPC ........... *B25J 9/1669* (2013.01); *B25J 9/1605* (2013.01); *B25J 9/1633* (2013.01)

(58) Field of Classification Search
CPC ..... B25J 9/00; B25J 9/16; B25J 9/1602; B25J 9/1605; B25J 9/1628; B25J 9/1633; B25J 9/1656; B25J 9/163; B25J 9/1669; B62D 57/00; B62D 57/02; B62D 57/032; G05B 2219/00; G05B 2219/30; G05B 2219/39; G05B 2219/39322; G05B 2219/39338
USPC ......................................................... 700/246
See application file for complete search history.

(56) References Cited

U.S. PATENT DOCUMENTS

2022/0040851 A1* 2/2022 Ju ........................... B25J 9/1607

OTHER PUBLICATIONS

"Wang, Active Variable Impedance Control for Hydraulic Driving Articulated Robotic Leg, 2018, IEEE" (Year: 2018).*

* cited by examiner

*Primary Examiner* — Khoi H Tran
*Assistant Examiner* — Sarah A Tran
(74) *Attorney, Agent, or Firm* — SALIWANCHIK, LLOYD & EISENSCHENK

(57) ABSTRACT

The present disclosure relates to a method for generating a novel impedance configuration for a three-degree-of-freedom (3DOF) leg of a hydraulically-driven legged robot. The method includes: separately determining variations of input signals of an inner position-based control loop and an inner force-based control loop of a hydraulic drive unit of each joint based on an obtained mathematical model; generating a novel impedance configuration in which position-based control is performed on a hydraulic drive unit of a hip joint, and force-based control is performed on hydraulic drive units of a knee joint and an ankle joint in a hydraulic drive system of the leg of a to-be-controlled robot; and performing forward calculation by using the leg mathematical model, to obtain an actual position and a force variation of the foot of the leg of the to-be-controlled robot to control motion of the foot of the to-be-controlled robot within motion space.

4 Claims, 21 Drawing Sheets

```
┌─────────────────────────────────────────────────────────────┐
│ Obtain a mathematical model of a hydraulic drive system     │─ 100
│ of the leg of a to-be-controlled robot                      │
└─────────────────────────────────────────────────────────────┘
                              │
                              ▼
┌─────────────────────────────────────────────────────────────┐
│ When the foot of the to-be-controlled robot suffers         │
│ disturbing force, determine a variation of an input signal  │─ 101
│ of an inner position-based control loop of the hydraulic    │
│ drive unit of each joint based on the mathematical model    │
└─────────────────────────────────────────────────────────────┘
                              │
                              ▼
┌─────────────────────────────────────────────────────────────┐
│ When the foot suffers a disturbing position, determine a    │─ 102
│ variation of an input signal of an inner force-based        │
│ control loop of the hydraulic drive unit of each joint      │
│ based on the mathematical model                             │
└─────────────────────────────────────────────────────────────┘
                              │
                              ▼
┌─────────────────────────────────────────────────────────────┐
│ Generate a novel impedance configuration in which           │─ 103
│ position-based control is performed on an inner control     │
│ loop of a hydraulic drive unit of the hip joint, and        │
│ force-based control is performed on inner control loops     │
│ of hydraulic drive units of the knee joint and the ankle    │
│ joint, and use a servo valve to obtain output positions     │
│ and output force of the hydraulic drive units of the hip    │
│ joint, the knee joint, and the ankle joint                  │
└─────────────────────────────────────────────────────────────┘
                              │
                              ▼
┌─────────────────────────────────────────────────────────────┐
│ Based on the output positions and the output force of the   │─ 104
│ hydraulic drive units of the hip joint, the knee joint, and │
│ the ankle joint, perform forward calculation by using the   │
│ leg kinematics model, the leg statics model, the mapping    │
│ between the elongation of the hydraulic drive unit of each  │
│ joint and the rotation angle of each joint, and the mapping │
│ among the force applied to the hydraulic drive unit of each │
│ joint, the rotation angle of each joint, and the torque of  │
│ each joint, to obtain the actual position and a force       │
│ variation of the foot of the leg                            │
└─────────────────────────────────────────────────────────────┘
```

FIG. 1

METHOD FOR GENERATING NOVEL IMPEDANCE CONFIGURATION FOR THREE-DEGREE-OF-FREEDOM (3DOF) ROBOTIC LEG

CROSS-REFERENCE TO RELATED APPLICATION

This application claims the benefit of Chinese Patent Application No. 202011179099.8, filed Oct. 29, 2020, which is hereby incorporated by reference in its entirety.

TECHNICAL FIELD

The present disclosure relates to the field of robot control, and in particular, to a method for generating a novel impedance configuration for a three-degree-of-freedom (3DOF) leg of a hydraulically-driven legged robot.

BACKGROUND

In recent years, robots have been widely applied in all walks of life. As an important part of the robot assembly, mobile robots are usually classified into the following types based on movement: wheeled robots, legged robots, spherical robots, tracked robots, and the like. Relative to robots moving in other manners, legged biomimetic robots can better adapt to unknown and unstructured environments. Particularly, after being integrated with a hydraulic drive with a high power-to-weight ratio, the legged biomimetic robots can be improved greatly in motion performance and load capabilities. The legged biomimetic robots can better complete tasks such as material transportation, rescue, detection, and military assistance in complicated environments (such as ice surfaces, snowy lands, sandy lands, and rubble), and gain close attention from scholars all over the world.

The overall gait control performance of a hydraulically-driven legged robot is determined by motion control performance of each leg, and the motion control performance of the leg is determined by swing phase trajectory tracking performance and stance phase compliance control performance of the leg. Impedance control is an effective control method that can implement trajectory tracking and compliance for the leg. In impedance control, an inner hydraulic control loop is used as a core, and an outer impedance control loop is added, so that the system implements an output correspondence between a position and force. Frequently-used inner hydraulic control loops include an inner position-based control loop and an inner force-based control loop, and corresponding hydraulic control methods are referred to as position-based impedance control and force-based impedance control. The two impedance control methods are obviously different in construction of a mathematical model, design of a core controller, parameter selection, and experiment system construction, and therefore have different dynamic compliance. At present, the two impedance control methods have been widely used in all kinds of legged robots. Although mature optimized control methods have been provided, due to restrictions of an impedance control mechanism, there is limited space for improving control precision and response capabilities of the two impedance control methods. How to further improve the motion control performance of the leg of this kind of robot has become one of challenges in this field. Therefore, it is necessary to preferably select different inner-loop core control modes for various joints of the leg, to give full play to advantages of the two impedance control methods.

In conclusion, in leg compliance control of the hydraulically-driven legged robot, a novel impedance configuration needs to be urgently designed for a 3DOF leg.

SUMMARY

An objective of the present disclosure is to provide a method for generating a novel impedance configuration for a 3DOF robotic leg, to further improve motion control performance of a robotic leg.

To achieve the above purpose, the present disclosure provides the following technical solutions.

A method for generating a novel impedance configuration for a three-degree-of-freedom (3DOF) robotic leg includes:
  obtaining a mathematical model of a hydraulic drive system of the leg of a to-be-controlled robot, where the mathematical model includes a leg kinematics model, a leg statics model, a leg dynamics model, a leg impedance characteristic model, a mapping between an elongation of a hydraulic drive unit of each joint of the leg and a rotation angle of each joint of the leg, and a mapping among force applied to the hydraulic drive unit of each joint, the rotation angle of each joint, and a torque of each joint; and a hip joint, a knee joint, and an ankle joint are included;
  determining, when the foot of the to-be-controlled robot suffers disturbing force, a variation of an input signal of an inner position-based control loop of a hydraulic drive unit of each joint based on the mathematical model;
  determining, when the foot suffers a disturbing position, a variation of an input signal of an inner force-based control loop of the hydraulic drive unit of each joint based on the mathematical model;
  generating a novel impedance configuration in which position-based control is performed on an inner control loop of a hydraulic drive unit of the hip joint, and force-based control is performed on inner control loops of hydraulic drive units of the knee joint and the ankle joint, and using a servo valve to obtain output positions and output force of the hydraulic drive units of the hip joint, the knee joint, and the ankle joint; and
  based on the output positions and the output force of the hydraulic drive units of the hip joint, the knee joint, and the ankle joint, performing forward calculation by using the leg kinematics model, the leg statics model, the mapping between the elongation of the hydraulic drive unit of each joint and the rotation angle of each joint, and the mapping among the force applied to the hydraulic drive unit of each joint, the rotation angle of each joint, and the torque of each joint, to obtain an actual position and a force variation of the foot of the leg.

Preferably, before the obtaining a mathematical model of a hydraulic drive system of the leg of a to-be-controlled robot, the method further includes:
  obtaining a length of each member in the hydraulic drive system of the leg of the to-be-controlled robot, the rotation angle of each joint, and the torque of each joint, where a thigh member, a crus member, and a foot member are included;
  constructing the leg kinematics model based on the length of each member and the rotation angle of each joint;

constructing the leg statics model based on the length of each member, the rotation angle of each joint, and the torque of each joint; and constructing the leg dynamics model based on a Lagrangian dynamics equation.

Preferably, the determining, when the foot of the to-be-controlled robot suffers disturbing force, a variation of an input signal of an inner position-based control loop of the hydraulic drive unit of each joint based on the mathematical model specifically includes:

when the foot of the to-be-controlled robot suffers the disturbing force, detecting, by a force sensor of the hydraulic drive unit of each joint, a force signal, performing inverse calculation by using the leg dynamics model, to obtain a disturbing force component of the foot in the signal detected by the force sensor of the hydraulic drive unit of each point, and performing forward calculation by using the leg statics model, the mapping between the elongation of the hydraulic drive unit of each joint and the rotation angle of each joint, and the mapping among the force applied to the hydraulic drive unit of each joint, the rotation angle of each joint, and the torque of each joint, to obtain the disturbing force that the foot suffers;

using a leg impedance characteristic solver to obtain a foot position variation corresponding to the disturbing force that the foot suffers; and performing inverse calculation based on the foot position variation by using the leg kinematics model and the mapping between the elongation of the hydraulic drive unit of each joint and the rotation angle of each joint, to obtain the variation of the input signal of the inner position-based control loop of the hydraulic drive unit of each joint.

Preferably, the determining, when the foot suffers a disturbing position, a variation of an input signal of an inner force-based control loop of the hydraulic drive unit of each joint based on the mathematical model specifically includes:

when the foot suffers the disturbing position, detecting, by a position sensor of the hydraulic drive unit of each joint, a position signal, and then performing forward calculation by using the leg kinematics model and the mapping between the elongation of the hydraulic drive unit of each joint and the rotation angle of each joint, to obtain a position signal of the foot, where the position signal of the foot includes an input position of the foot and the actual position of the foot;

obtaining a desired outer-loop position of the foot based on the position signal of the foot; and converting the desired outer-loop position of the foot into a corresponding desired force signal of foot impedance by using a leg impedance characteristic solver, and performing inverse calculation on the desired force signal of the foot impedance by using the leg statics model, the mapping between the elongation of the hydraulic drive unit of each joint and the rotation angle of each joint, and the mapping among the force applied to the hydraulic drive unit of each point, the rotation angle of each joint, and the torque of each joint, to obtain the variation of the input signal of the inner force-based control loop of the hydraulic drive unit of each joint.

According to specific embodiments provided in the present disclosure, the present disclosure has the following two technical effects.

According to the method for generating a novel impedance configuration for a 3DOF leg of a hydraulically-driven legged robot in the present disclosure, a novel impedance configuration in which position-based control is performed on a hydraulic drive unit of a hip joint, and force-based control is performed on hydraulic drive units of a knee joint and an ankle joint in a hydraulic drive system of a leg is generated, to control motion of the foot of a to-be-controlled robot within motion space. This method not only considers impact of different load mass and installation positions on control performance of each joint, but also gives full play to an advantage of position-based control in precision and an advantage of force-based control in response speed, thereby increasing its applicability.

In addition, when kinematics calculation is performed on the 3DOF leg, a same foot position is obtained based on different combinations of angle variations of the three joints. As a result, in a process of performing traditional force-based impedance control (force-based control is performed on all of the hip, knee, and ankle joints), the foot position keeps unchanged, but positions of the joints are constantly changing and cannot be controlled. Consequently, traditional force-based impedance control cannot be applied directly, and other algorithms are required, thereby greatly increasing the control difficulty. The novel impedance configuration proposed in the present disclosure can be used to effectively resolve the foregoing problem in traditional force-based impedance control, and ensure motion control performance of the foot of the robot. In addition, the novel impedance configuration in which position-based control is performed on the hydraulic drive unit of the hip joint, and force-based control is performed on the hydraulic drive units of the knee joint and the ankle joint can be used to effectively resolve the following problem that there are multiple solutions in statics when impedance control is performed on the 3DOF leg.

BRIEF DESCRIPTION OF DRAWINGS

To describe the technical solutions in the embodiments of the present disclosure or in the prior art more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 1 is a flowchart of a method for generating a novel impedance configuration for a 3DOF robotic leg in the present disclosure;

Figure 2:
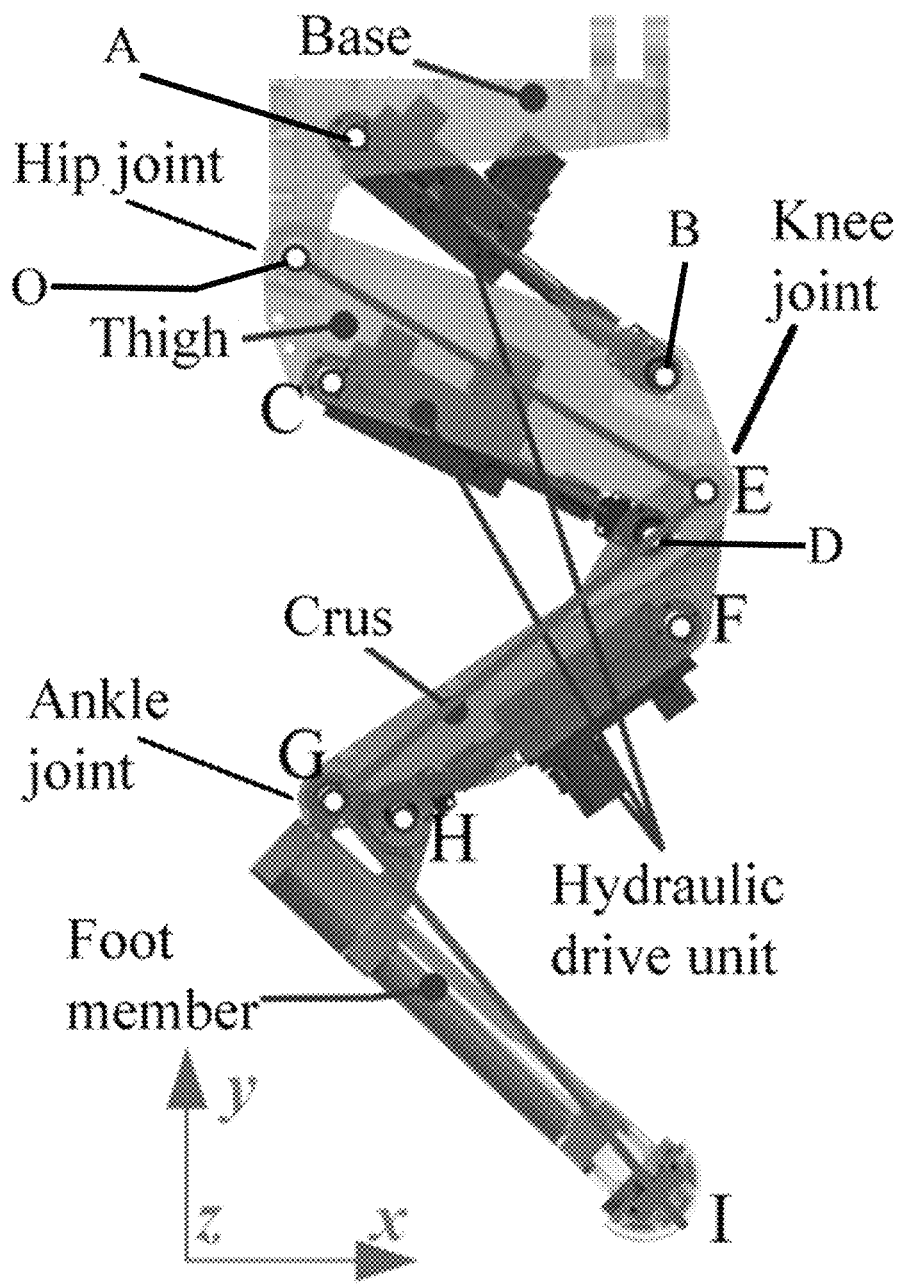
FIG. 2 shows a model of a hydraulic drive system of a 3DOF leg of a legged robot in an embodiment of the present disclosure.
Figure 13:
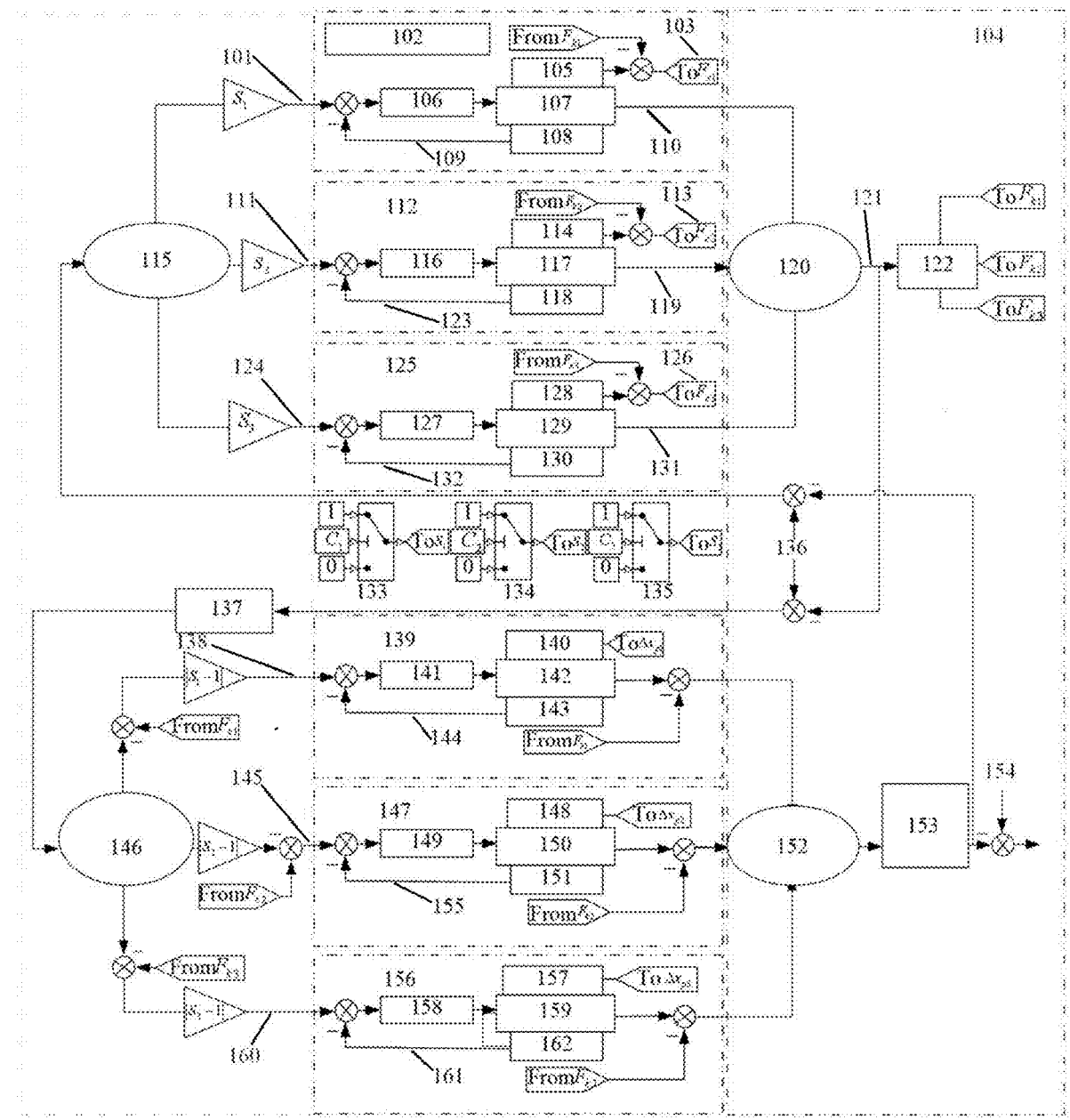
FIG. 13 shows a principle of implementing an impedance configuration scheme for a hydraulic drive system of a leg in an embodiment of the present disclosure.

Meanings of parameters in the accompanying drawings:
O: hip joint in a hydraulic drive system of a leg; E: knee joint in the hydraulic drive system of the leg; G: ankle joint in the hydraulic drive system of the leg; A: position at which a hydraulic drive unit of the hip joint is connected to a base; B: position at which the hydraulic drive unit of the hip joint is connected to a thigh: C: position at which a hydraulic drive unit of the knee joint is connected to the thigh; D: position at which the hydraulic drive unit of the knee joint is connected to a crus; F: position at which a hydraulic drive unit of the ankle joint is connected to the crus; H: position at which the hydraulic drive unit of the ankle joint is connected to a foot member; I: vertex of a semicylindrical foot; OE: length from the hip joint to the knee joint; EG: length from the knee joint to the ankle joint; GI: length from the ankle joint to the foot; $\theta_1$: rotation angle of the hip joint, namely, an included angle formed between the thigh member and a positive direction of an axis $x_0$; $\theta_2$: rotation angle of the knee joint, namely, an included angle formed between the crus member EG and an extension line of the thigh member OE; $\theta_3$: rotation angle of the ankle joint, namely, an included angle formed between an extension line of the crus member EG and the foot member GI; $\alpha$: included angle formed between the EG and an ED; $\beta$: included angle formed between an OA and the positive direction of the axis $x_0$; AB: total elongation of the hydraulic drive unit of the hip joint; CD: total elongation of the hydraulic drive unit of the knee joint; FH: total elongation of the hydraulic drive unit of the ankle joint; $\Delta F_{s1}$: detection signal of a force sensor of the hydraulic drive unit of the hip joint; $\Delta F_{s2}$: detection signal of a force sensor of the hydraulic drive unit of the knee joint; $\Delta F_{s3}$: detection signal of a force sensor of the hydraulic drive unit of the ankle joint; $X_{foot}^x$: actual position applied to the foot of the leg in an x-axis direction; $X_{foot}^y$: actual position applied to the foot of the leg in a y-axis direction; $F_{foot}^x$: force applied to the foot of the leg in the x-axis direction; $F_{foot}^y$: force applied to the foot of the leg in the y-axis direction; $\tau_1$: torque of the hip joint; $\rho_2$: torque of the knee joint; $\tau_3$: torque of the ankle joint; $m_1$: mass of the thigh member; $m_2$: mass of the crus member; $m_3$: mass of the foot member; $\alpha_1$: an included angle formed between the OE and a line connecting a centroid of the thigh member and the point O; $\alpha_2$: an included angle formed between the EG and a line connecting a centroid of the crus member and the point E; $\alpha_3$: an included angle formed between the GI and a line connecting a centroid of the foot member and the point G; $M_{Dx}$: desired mass in the x-axis direction; $M_{Dy}$: desired mass in the y-axis direction; $B_{Dx}$: desired damping in the x-axis direction; $B_{Dy}$: desired damping in the y-axis direction; $K_{Dx}$: desired stiffness in the x-axis direction; $K_{Dy}$: desired stiffness in the y-axis direction; $\Delta X_{Dx}^{leg}$: actual position variation relative to an initial position in the x-axis direction; $\Delta X_{Dy}^{leg}$: actual position variation relative to the initial position in the y-axis direction; $\Delta X_{rx}^{leg}$: input position variation relative to the initial position in the x-axis direction; $\Delta X_{ry}^{leg}$: input position variation relative to the initial position in the y-axis direction; $\Delta F_{sx}^{foot}$: actual force variation relative to initial force in the x-axis direction; $\Delta F_{sy}^{foot}$: actual force variation relative to the initial force in the y-axis direction; $\Delta F_{kx}^{foot}$: resultant force, excluding disturbing force, calculated for the foot in the x-axis direction based on inverse dynamics; $\Delta F_{ky}^{foot}$: resultant force, excluding disturbing force, calculated for the foot in the y-axis direction based on inverse dynamics; $\Delta x_{p1}$: detection signal of a position sensor of the hydraulic drive unit of the hip joint; $\Delta x_{p2}$: detection signal of a position sensor of the hydraulic drive unit of the knee joint; $\Delta x_{p3}$: detection signal of a position sensor of the hydraulic drive unit of the ankle joint; $m_4$: total mass of the base member and a mechanical structure assembled for the base member; $\beta_1$: an included angle between the thigh member OE and a line connecting the centroid of the thigh member and the knee joint; $\beta_2$: an included angle between the crus member EG and a line connecting the centroid of the crus member and the ankle joint; $\beta_3$: an included angle between the positive direction of the axis $x_0$ and a line connecting a centroid of the base member and the hip joint;

Reference numerals in FIG. 13:
101: Input position of cylinder 1
102: Inner position-based control loop of cylinder 1
103: Inner position-based control loop of cylinder 1
104: Outer impedance control loop
105: Force sensor
106: Position controller
107: Hydraulic drive unit 1
108: Displacement sensor
109: Output position of cylinder 1
110: Output position of cylinder 1
111: Input position of cylinder 2
112: Inner position-based control loop of cylinder 2
113: Load capability of cylinder 2
114: Force sensor
115: Inverse kinematics of a mechanical structure of a robotic leg
116: Position controller
117: Hydraulic drive unit 2

118: Displacement sensor
119: Output position of cylinder 2
120: Forward kinematics of the mechanical structure of the robotic leg
121: Output position of a foot of the leg
122: Inverse leg dynamics calculation
123: Output position of cylinder 2
124: Input position of cylinder 3
125: Inner position-based control loop of cylinder 3
126: Load capability of cylinder 3
127: Position controller
128: Force sensor
129: Hydraulic drive unit 3
130: Displacement sensor
131: Output position of cylinder 3
132: Output position of cylinder 3
133: Switching switch of cylinder 1
134: Switching switch of cylinder 2
135: Switching switch of cylinder 3
136: Input position of the foot of the leg
137: Leg impedance characteristic solver
138: Input force of cylinder 1
139: Inner force-based control loop of cylinder 1
140: Displacement sensor
141: Force controller
142: Hydraulic drive unit 1
143: Force sensor
144: Output force of cylinder 1
145: Input force of cylinder 2
146: Inverse statics of the mechanical structure of the robotic leg
147: Inner force-based control loop of cylinder 2
148: Displacement sensor
149: Force controller
150: Hydraulic drive unit 2
151: Force sensor
152: Forward statics of the mechanical structure of the robotic leg
153: Leg impedance characteristic solver
154: Input position of the foot of the leg
155: Output force of cylinder 2
156: Inner force-based control loop of cylinder 3
157: Displacement sensor
158: Force controller
159: Hydraulic drive unit 3
160: Input force of cylinder 3
161: Output force of cylinder 3
162: Force sensor.

DETAILED DESCRIPTION

The following clearly and completely describes the technical solutions in the embodiments of the present disclosure with reference to accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a method for generating a novel impedance configuration for a 3DOF robotic leg, to further improve motion control performance of a robotic leg.

To make the foregoing objective, features, and advantages of the present disclosure clearer and more comprehensible, the present disclosure is further described in detail below with reference to the accompanying drawings and specific implementations.

To overcome a limitation of a control mechanism in an impedance control method in the prior art, and give full play to advantages of the control method in control precision, response speed, and the like, a novel impedance configuration is finally generated for a leg. In the novel impedance configuration, for a hydraulic drive system of a 3DOF leg, position-based control is performed on a hydraulic drive unit of a hip joint, and force-based control is performed on hydraulic drive units of a knee joint and an ankle joint. The novel configuration can be compatible with swing phase trajectory tracking control performance and stance phase compliance control performance of the hydraulic drive system of the leg within an entire motion period, and provide important support for high-performance motion control and leg structure design of a hydraulically-driven legged robot.

Based on the novel configuration, the present disclosure provides a method for generating a novel impedance configuration for a 3DOF robotic leg. As shown in FIG. 1, the method includes the following steps.

Step 100: Obtain a mathematical model of a hydraulic drive system of the leg of a to-be-controlled robot. The mathematical model includes a leg kinematics model, a leg statics model, a leg dynamics model, a leg impedance characteristic model, a mapping between an elongation of a hydraulic drive unit of each joint of the leg and a rotation angle of each joint of the leg, and a mapping among force applied to the hydraulic drive unit of each joint, the rotation angle of each joint, and a torque of each joint. A hip joint, a knee joint, and an ankle joint are included.

Step 101: When the foot of the to-be-controlled robot suffers disturbing force, determine a variation of an input signal of an inner position-based control loop of the hydraulic drive unit of each joint based on the mathematical model. This step specifically includes:

when the foot of the to-be-controlled robot suffers the disturbing force, detecting, by a force sensor of the hydraulic drive unit of each joint, a force signal, performing inverse calculation by using the leg dynamics model, to obtain a disturbing force component of the foot in the signal detected by the force sensor of the hydraulic drive unit of each point, and performing forward calculation by using the leg statics model, the mapping between the elongation of the hydraulic drive unit of each joint and the rotation angle of each joint, and the mapping among the force applied to the hydraulic drive unit of each joint, the rotation angle of each joint, and the torque of each joint, to obtain the disturbing force that the foot suffers;

using a leg impedance characteristic solver to obtain a foot position variation corresponding to the disturbing force that the foot suffers; and performing inverse calculation based on the foot position variation by using the leg kinematics model and the mapping between the elongation of the hydraulic drive unit of each joint and the rotation angle of each joint, to obtain the variation of the input signal of the inner position-based control loop of the hydraulic drive unit of each joint.

Step 102: When the foot suffers a disturbing position, determine a variation of an input signal of an inner force-based control loop of the hydraulic drive unit of each joint based on the mathematical model. This step specifically includes:

when the foot suffers the disturbing position, detecting, by a position sensor of the hydraulic drive unit of each joint, a position signal, and then performing forward calculation by using the leg kinematics model and the mapping between the elongation of the hydraulic drive unit of each joint and the rotation angle of each joint, to obtain a position signal of the foot, where the position signal of the foot includes an input position of the foot and an actual position of the foot;

obtaining a desired outer-loop position of the foot based on the position signal of the foot; and converting the desired outer-loop position of the foot into a corresponding desired force signal of foot impedance by using a leg impedance characteristic solver, and performing inverse calculation on the desired force signal of the foot impedance by using the leg statics model, the mapping between the elongation of the hydraulic drive unit of each joint and the rotation angle of each joint, and the mapping among the force applied to the hydraulic drive unit of each point, the rotation angle of each joint, and the torque of each joint, to obtain the variation of the input signal of the inner force-based control loop of the hydraulic drive unit of each joint.

Step 103: Generate a novel impedance configuration in which position-based control is performed on an inner control loop of a hydraulic drive unit of the hip joint, and force-based control is performed on inner control loops of hydraulic drive units of the knee joint and the ankle joint, and use a servo valve to obtain output positions and output force of the hydraulic drive units of the hip joint, the knee joint, and the ankle joint.

Step 104: Based on the output positions and the output force of the hydraulic drive units of the hip joint, the knee joint, and the ankle joint, perform forward calculation by using the leg kinematics model, the leg statics model, the mapping between the elongation of the hydraulic drive unit of each joint and the rotation angle of each joint, and the mapping among the force applied to the hydraulic drive unit of each joint, the rotation angle of each joint, and the torque of each joint, to obtain the actual position and a force variation of the foot of the leg.

Preferably, before the step 100, the method further includes:

obtaining a length of each member in the hydraulic drive system of the leg of the to-be-controlled robot, the rotation angle of each joint, and the torque of each joint, where a thigh member, a crus member, and a foot member are included;

constructing the leg kinematics model based on the length of each member and the rotation angle of each joint;

constructing the leg statics model based on the length of each member, the rotation angle of each joint, and the torque of each joint; and constructing the leg dynamics model based on a Lagrangian dynamics equation.

The following further describes the solutions in the present disclosure by using a specific embodiment. The specific embodiment of the present disclosure is described by using an example in which the to-be-controlled robot is a hydraulically-driven legged robot. In specific application, the solutions in the present disclosure are also applicable to another type of legged robot.

Step 1: Simplify a mechanical structure of a hydraulic drive system of a leg, to obtain a leg kinematics model, a leg statics model, a leg dynamics model, a mapping between an elongation of a hydraulic drive unit of each joint and a rotation angle of each joint, and a mapping among force applied to each hydraulic drive unit, the rotation angle of each joint, and a torque of each joint.

FIG. 2 shows a three-dimensional model of a hydraulic drive system of a 3DOF leg of a legged robot. As shown in FIG. 2, a hip joint is connected to a base and a thigh, and a hydraulic drive unit of the hip joint is used to control an angle of the hip joint. A knee joint is connected to the thigh and a crus, and a hydraulic drive unit of the knee joint is used to control an angle of the knee joint. An ankle joint is connected to the crus and a foot member, and a hydraulic drive unit of the ankle joint is used to control an angle of the ankle joint. A foot position of the leg is controlled by controlling the angles of the hip joint, the knee joint, and the ankle joint.

The hydraulic drive unit mainly includes a servo cylinder, a servo valve, a position sensor, and a force sensor. The force sensor and the position sensor are used for force closed-loop control and position closed-loop control of the hydraulic drive unit.

Figure 3:
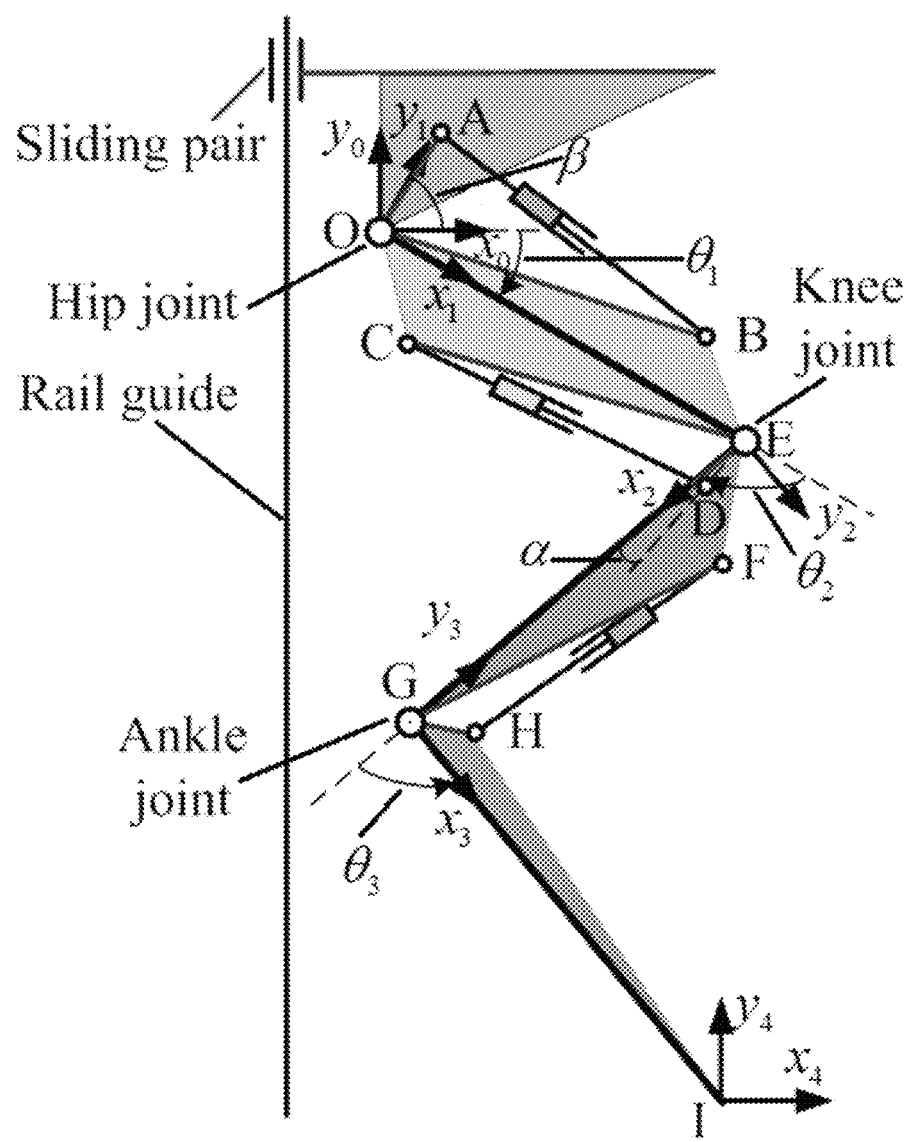
FIG. 3 is a schematic diagram of a forward leg kinematics model in an embodiment of the present disclosure.

The mechanical structure of the hydraulic drive system of the leg is complicated. For convenience of kinematic analysis, the model of the hydraulic drive system of the leg of the legged robot in FIG. 2 is simplified into a model in FIG. 3. FIG. 3 is a schematic diagram of the forward leg kinematic model.

D-H parameters of the mechanical structure can be obtained based on FIG. 3, and are shown in Table 1.

TABLE 1

D-H parameters of the mechanical structure of the hydraulic drive system of the leg

| Link serial number | $a_{i-1}$ | $\alpha_{i-1}$ | $d_i$ | $\theta_i$ |
| --- | --- | --- | --- | --- |
| 1 | 0 | 0 | 0 | $\theta_1$ |
| 2 | $l_1$ | 0 | 0 | $\theta_2$ |
| 3 | $l_2$ | 0 | 0 | $\theta_3$ |
| 4 | $l_3$ | 0 | 0 | — |

In Table 1, $a_{i-1}$ represents a distance that is between $z_{i-1}$ and $z_i$ and that is measured along $x_{i-1}$. $\alpha_{i-1}$ represents an angle that is between $z_{i-1}$ and $z_i$ and that is rotated around $x_{i-1}$. $d_i$ represents a distance that is between $x_{i-1}$ and $x_i$ and that is measured along $z_i$. $\theta_i$ represents an angle that is between $x_{i-1}$ and $x_i$ and that is rotated around $z_i$.

In a single-leg D-H coordinate system shown in FIG. 3, a pose relationship may be expressed by a link transformation formula $_i^{i-1}T$.

$$_i^{i-1}T = \begin{bmatrix} \cos\theta_i & -\sin\theta_i & 0 & a_{i-1} \\ \sin\theta_i\cos\alpha_{i-1} & \cos\theta_i\cos\alpha_{i-1} & -\sin\alpha_{i-1} & -d_i\sin\alpha_{i-1} \\ \sin\theta_i\sin\alpha_{i-1} & \cos\theta_i\sin\alpha_{i-1} & \cos\alpha_{i-1} & d_i\cos\alpha_{i-1} \\ 0 & 0 & 0 & 1 \end{bmatrix} \quad (1)$$

$_4^0T$ can be obtained by multiplying $_1^0T$, $_2^1T$, $_3^2T$, $_4^3T$ in sequence.

$$
{}_4^0 T = {}_1^0 T {}_2^1 T {}_3^2 T {}_4^3 T = \begin{bmatrix} \cos(\theta_1+\theta_2+\theta_3+\theta_4) & -\sin(\theta_1+\theta_2+\theta_3+\theta_4) & 0 & \begin{array}{l} l_1\cos\theta_1 + l_2\cos(\theta_1+\theta_2) + \\ l_3\cos(\theta_1+\theta_2+\theta_3) \end{array} \\ \sin(\theta_1+\theta_2+\theta_3+\theta_4) & \cos(\theta_1+\theta_2+\theta_3+\theta_4) & 0 & \begin{array}{l} l_1\sin\theta_1 + l_2\sin(\theta_1+\theta_2) + \\ l_3\sin(\theta_1+\theta_2+\theta_3) \end{array} \\ 0 & 0 & 1 & 0 \\ 0 & 0 & 0 & 1 \end{bmatrix} \quad (2)
$$

Therefore, the kinematics model (forward kinematics) can be obtained according to the formula (2):

$$
\begin{cases} X_{foot}^X = l_1\cos\theta_1 + l_2\cos(\theta_1+\theta_2) + l_3\cos(\theta_1+\theta_2+\theta_3) \\ X_{foot}^Y = l_1\sin\theta_1 + l_2\sin(\theta_1+\theta_2) + l_3\sin(\theta_1+\theta_2+\theta_3) \end{cases}
$$

As described above, $l_1$ represents a length from the hip joint to the knee joint, $l_2$ represents a length from the knee joint to the ankle joint, and $l_3$ represents a length from the ankle joint to the foot, $\theta_1$ represents a rotation angle of the hip joint, $\theta_2$ represents a rotation angle of the knee joint, and $\theta_3$ represents a rotation angle of the ankle joint.

Figure 4:
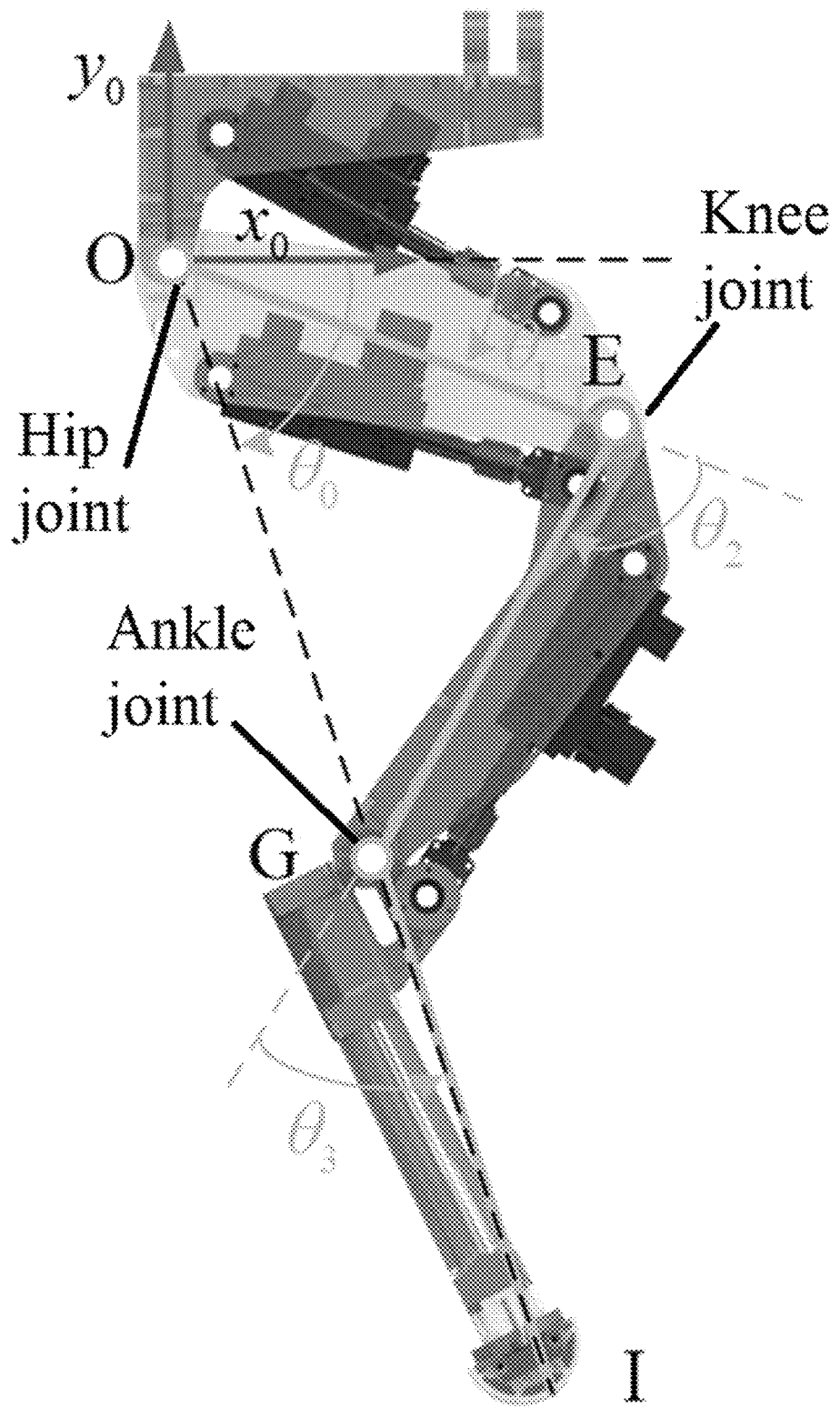
FIG. 4 is a schematic diagram of an inverse leg kinematics model in an embodiment of the present disclosure.

FIG. 4 is a schematic diagram of an inverse leg kinematics model. The model is used to avoid indefinite solutions in inverse kinematics. In the present disclosure, the hydraulic drive system of the leg is equivalent to that shown in FIG. 4, so that the hip joint O, the ankle joint G, and the foot I are collinear.

Based on a geometrical relationship in FIG. 4, the rotation angle $\theta_1$ of the hip joint, the rotation angle $\theta_2$ of the knee joint, and the rotation angle $\theta_3$ of the ankle joint can be obtained as follows:

$$
\theta_1 = \theta_0 + \angle EOG = \arctan2(X_{foot}^Y, X_{foot}^X) + \arccos\left(\frac{OE^2 + \left(\sqrt{X_{foot}^{Y2} + X_{foot}^{X2}} - GI\right)^2 - EG^2}{2 \cdot OE \cdot OG}\right) \quad (4)
$$

$$
\theta_2 = \angle OEG - \pi = \arccos\left(\frac{OE^2 + EG^2 - \left(\sqrt{X_{foot}^{Y2} + X_{foot}^{X2}} - GI\right)^2}{2 \cdot OE \cdot EG}\right) - \pi
$$

$$
\theta_3 = \angle OGE = \arccos\left(\frac{\left(\sqrt{X_{foot}^{Y2} + X_{foot}^{X2}} - GI\right)^2 + EG^2 - OE^2}{2 \cdot \left(\sqrt{X_{foot}^{Y2} + X_{foot}^{X2}} - GI\right) \cdot EG}\right)
$$

Figure 5:
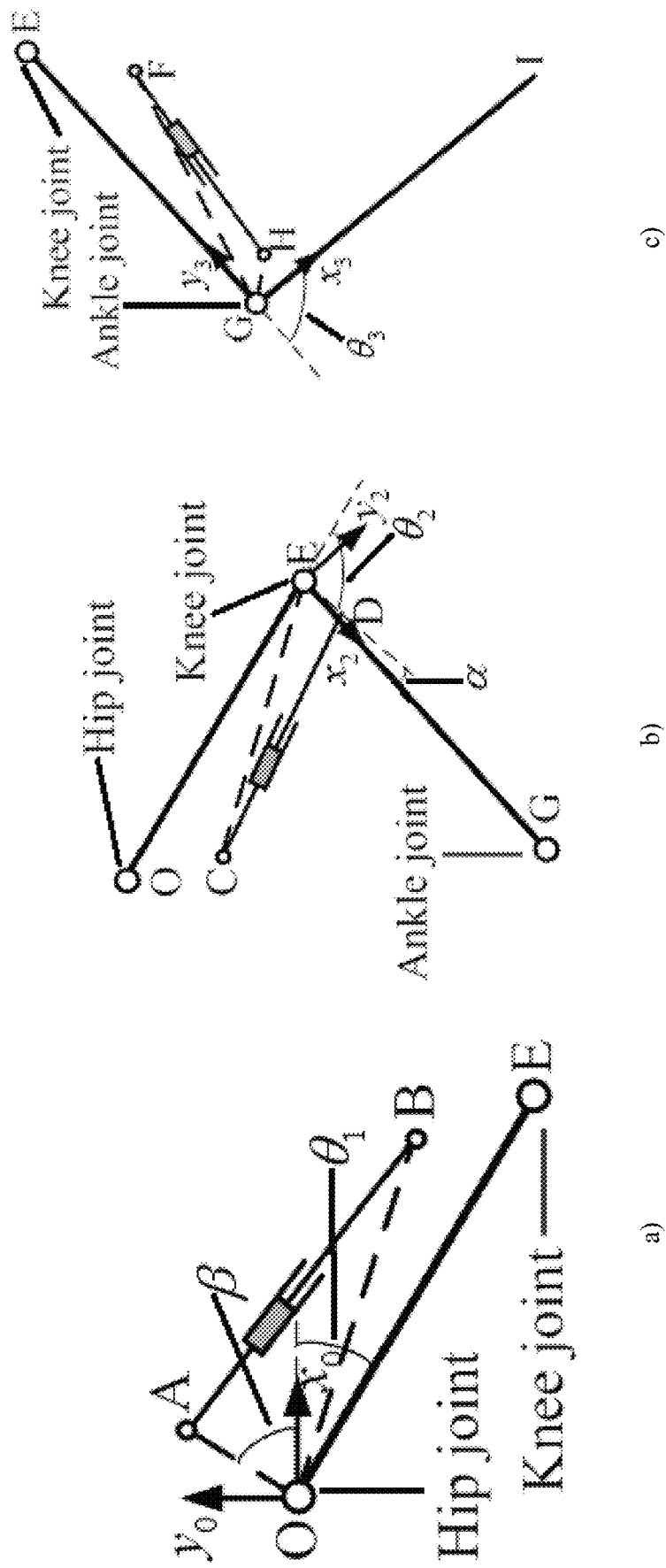
FIG. 5 shows a relationship between an angle of a joint and an elongation of a hydraulic drive unit of the joint in an embodiment of the present disclosure.

In FIG. 5, a) to c) each show a relationship between the angle of each joint and the elongation of the hydraulic drive unit of each joint.

A total elongation AB of the hydraulic drive unit of the hip joint, a total elongation CD of the hydraulic drive unit of the knee joint, and a total elongation FH of the hydraulic drive unit of the ankle joint are obtained as follows:

$AB = l_{01} + \Delta x_{p1}$ $CD = l_{02} + \Delta x_{p2}$ $FH = l_{03} + \Delta x_{p3}$ (5)

As described above, $l_{01}$ represents an initial length of the hydraulic drive unit of the hip joint, $l_{02}$ represents an initial length of the hydraulic drive unit of the knee joint, and $l_{03}$ represents an initial length of the hydraulic drive unit of the ankle joint.

Based on a geometrical relationship in FIG. 5, the rotation angle $\theta_1$ of the hip joint, the rotation angle $\theta_2$ of the knee joint, and the rotation angle $\theta_3$ of the ankle joint can be obtained as follows:

$$
\theta_1 = \beta - \angle AOB - \angle BOE = \beta - \arccos\left(\frac{OA^2 + OB^2 - (l_{01} + \Delta x_{p1})^2}{2 \cdot OA \cdot OB}\right) - \angle BOE \quad (6)
$$

$$
\theta_2 = \angle CED - \pi - \alpha + \angle OEC = \arccos\left(\frac{EC^2 + ED^2 - (l_{02} + \Delta x_{p2})^2}{2 \cdot EC \cdot ED}\right) - \pi - \alpha + \angle OEC
$$

$$
\theta_3 = \pi - \angle FGH - \angle IGH - \angle EGF = \pi - \arccos\left(\frac{GF^2 + GH^2 - (l_{03} + \Delta x_{p3})^2}{2 \cdot GF \cdot GH}\right) - \angle IGH - \angle EGF
$$

According to the foregoing formulas, an elongation $\Delta x_{p1}$ of the hydraulic drive unit of the hip joint, an elongation $\Delta x_{p2}$ of the hydraulic drive unit of the knee joint, and an elongation $\Delta x_{p3}$ of the hydraulic drive unit of the ankle joint can be obtained as follows:

$$
\Delta x_{p1} = \sqrt{OA^2 + OB^2 - 2 \cdot OA \cdot OB \cdot \cos(\beta - \angle BOE - \theta_1)} - l_{01} \quad (7)
$$

$$
\Delta x_{p2} = \sqrt{EC^2 + ED^2 - 2 \cdot EC \cdot ED \cdot \cos(\angle OEC - \theta_2 - \pi - \alpha)} - l_{02}
$$

$$
\Delta x_{p3} = \sqrt{GF^2 + GH^2 - 2 \cdot GF \cdot GH \cdot \cos(\theta_3 - \pi + \angle IGH + \angle EGF)} - l_{03}
$$

Figure 6:
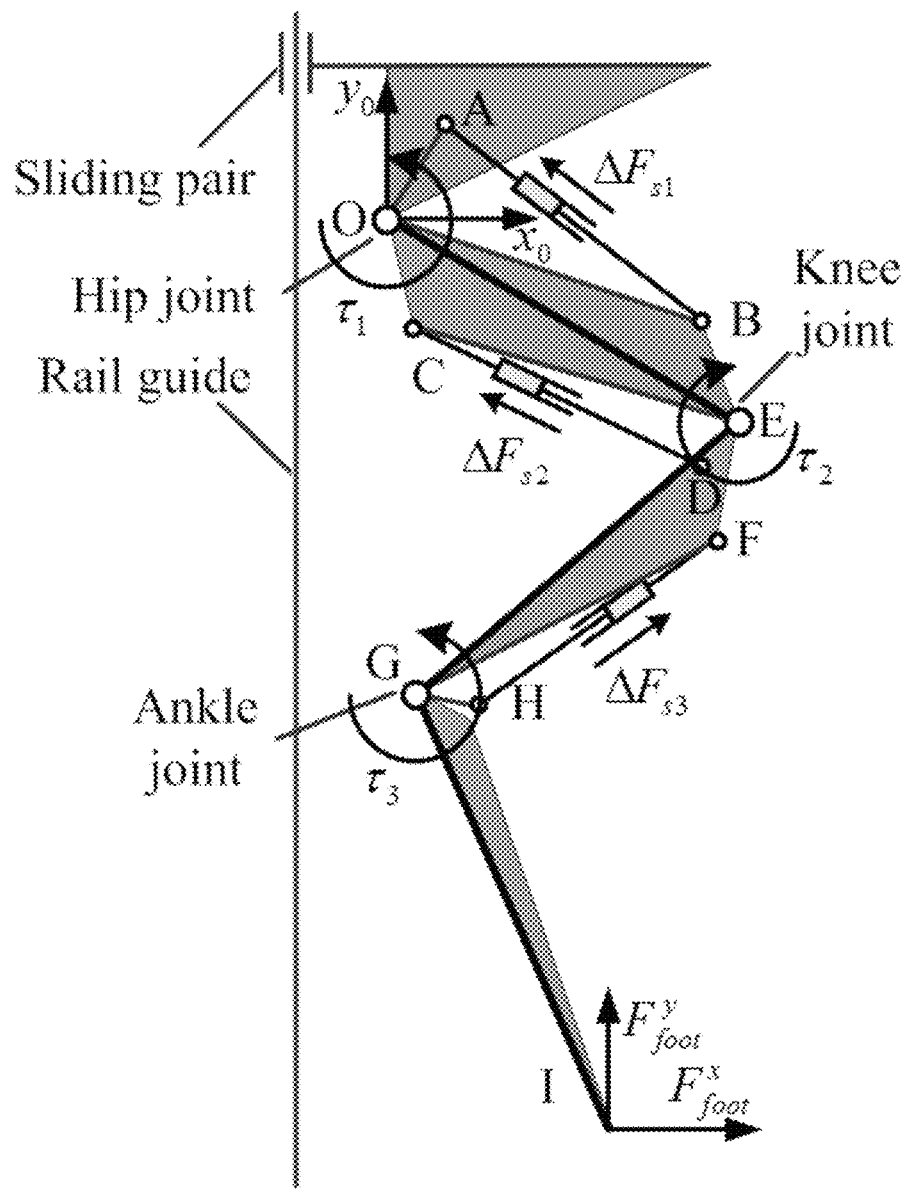
FIG. 6 is a schematic diagram of a leg statics model in an embodiment of the present disclosure.

FIG. 6 is a schematic diagram of the leg statics model.

According to the principle of virtual work, a torque vector $\tau$ of each joint can be obtained as follows:

$\tau = J^T(q) F$ (8)

As described above, F represents force (N) applied to the foot of the leg, and $J^T(q)$ represents a force Jacobian of the leg.

In the formula (8), the force Jacobian $J^T(q)$ of the leg is as follows:

$$
J^T(q) = \begin{bmatrix} \dfrac{\partial X_{foot}^X}{\partial \theta_1} & \dfrac{\partial X_{foot}^Y}{\partial \theta_1} \\ \dfrac{\partial X_{foot}^X}{\partial \theta_2} & \dfrac{\partial X_{foot}^Y}{\partial \theta_2} \\ \dfrac{\partial X_{foot}^X}{\partial \theta_3} & \dfrac{\partial X_{foot}^Y}{\partial \theta_3} \end{bmatrix} = \quad (9)
$$

-continued $$\begin{bmatrix} -l_1\sin(\theta_1) - l_2\sin(\theta_1 + \theta_2) - & l_1\cos(\theta_1) + l_2\cos(\theta_1 + \theta_2) + \\ l_3\sin(\theta_1 + \theta_2 + \theta_3) & l_3\cos(\theta_1 + \theta_2 + \theta_3) \\ -l_2\sin(\theta_1 + \theta_2) - & l_2\cos(\theta_1 + \theta_2) + \\ l_3\sin(\theta_1 + \theta_2 + \theta_3) & l_3\cos(\theta_1 + \theta_2 + \theta_3) \\ -l_3\sin(\theta_1 + \theta_2 + \theta_3) & l_3\cos(\theta_1 + \theta_2 + \theta_3) \end{bmatrix}$$

The torque vector τ of each joint that is obtained according to the formulas (8) and (9) is as follows:

$$\tau_1 = -F_{foot}^x \begin{pmatrix} l_1\sin(\theta_1) + l_2\sin(\theta_1 + \theta_2) + \\ l_3\sin(\theta_1 + \theta_2 + \theta_3) \end{pmatrix} + \quad (10)$$

$$F_{foot}^y \begin{pmatrix} l_1\cos(\theta_1) + l_2\cos(\theta_1 + \theta_2) + \\ l_3\cos(\theta_1 + \theta_2 + \theta_3) \end{pmatrix}$$

$$\tau_2 = -F_{foot}^x \begin{pmatrix} l_2\sin(\theta_1 + \theta_2) + l_3\sin\begin{pmatrix} \theta_1 + \\ \theta_2 + \theta_3 \end{pmatrix} \end{pmatrix} +$$

$$F_{foot}^y \begin{pmatrix} l_2\cos(\theta_1 + \theta_2) + l_3\cos\begin{pmatrix} \theta_1 + \\ \theta_2 + \theta_3 \end{pmatrix} \end{pmatrix}$$

$$\tau_3 = -F_{foot}^x l_3\sin(\theta_1 + \theta_2 + \theta_3) + F_{foot}^y l_3\cos(\theta_1 + \theta_2 + \theta_3)$$

As described above, $\tau_1$ represents a torque of the hip joint, $\tau_2$ represents a torque of the knee joint, and $\tau_3$ represents a torque of the ankle joint.

Forward statics is to obtain, based on the torque of each joint, the force applied to the foot. In the present disclosure, the force applied to the foot is obtained based on the torques of the knee joint and the ankle joint. Then, the leg statics model (forward leg statics) can be obtained as follows:

$$\begin{cases} F_{foot}^x = \dfrac{\tau_2 l_3 \cos(\theta_1 + \theta_2 + \theta_3) - \tau_3(l_2\cos(\theta_1 + \theta_2) + l_3\cos(\theta_1 + \theta_2 + \theta_3))}{l_2 l_3 \sin(\theta_3)} \\ F_{foot}^y = \dfrac{\tau_2 l_3 \sin(\theta_1 + \theta_2 + \theta_3) - \tau_3(l_2\sin(\theta_1 + \theta_2) + l_3\sin(\theta_1 + \theta_2 + \theta_3))}{l_2 l_3 \sin(\theta_3)} \end{cases} \quad (11)$$

Figure 7:
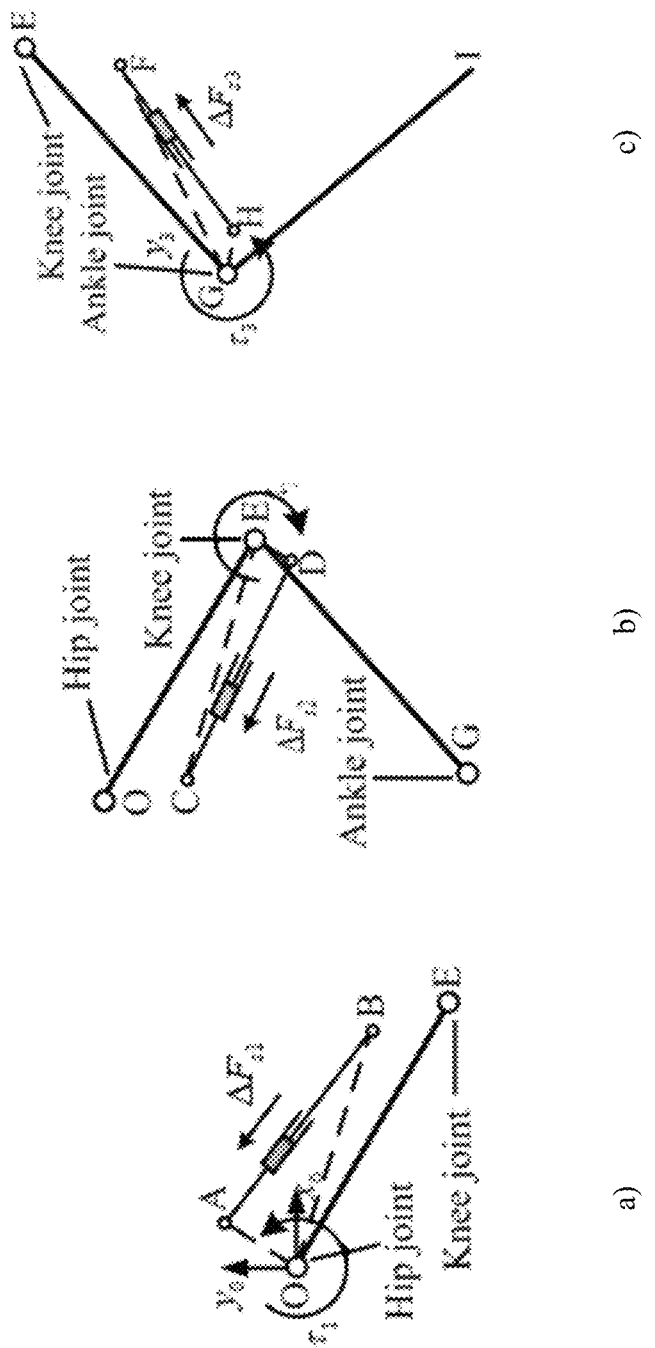
FIG. 7 shows a relationship between a torque of each joint and force applied to a drive unit of each joint in an embodiment of the present disclosure.

In FIG. 7, a) to c) each show a relationship between the torque of each joint and the force applied to the drive unit of each joint.

Based on a geometrical relationship in FIG. 7, it can be learned that a mapping between a detection value $\Delta F_{s1}$ of the force sensor of the hip joint and the torque $\tau_1$ of the hip joint, a mapping between a detection value $\Delta F_{s2}$ of the force sensor of the knee joint and the torque $\tau_2$ of the knee joint, and a mapping between a detection value $\Delta F_{s3}$ of the force sensor of the ankle joint and the torque $\tau_3$ of the ankle joint are as follows:

$$\tau_1 = \Delta F_{s1} \cdot OB \cdot \sin\left(\arccos\left(\dfrac{(l_{01} + \Delta x_{p1})^2 + OB^2 - OA^2}{2 \cdot (l_{01} + \Delta x_{p1}) \cdot OB}\right)\right) \quad (12)$$

$$\tau_2 = -\Delta F_{s2} \cdot EC \cdot \sin\left(\arccos\left(\dfrac{(l_{02} + \Delta x_{p2})^2 + EC^2 - ED^2}{2 \cdot (l_{02} + \Delta x_{p2}) \cdot EC}\right)\right)$$

$$\tau_3 = \Delta F_{s3} \cdot GF \cdot \sin\left(\arccos\left(\dfrac{(l_{03} + \Delta x_{p3})^2 + GF^2 - GH^2}{2 \cdot (l_{03} + \Delta x_{p3}) \cdot GF}\right)\right)$$

In FIG. 7, a solid line between a hydraulic cylinder and a joint represents an entity. A dashed line between a hydraulic cylinder and a joint is an auxiliary line for formula derivation.

Figure 8:
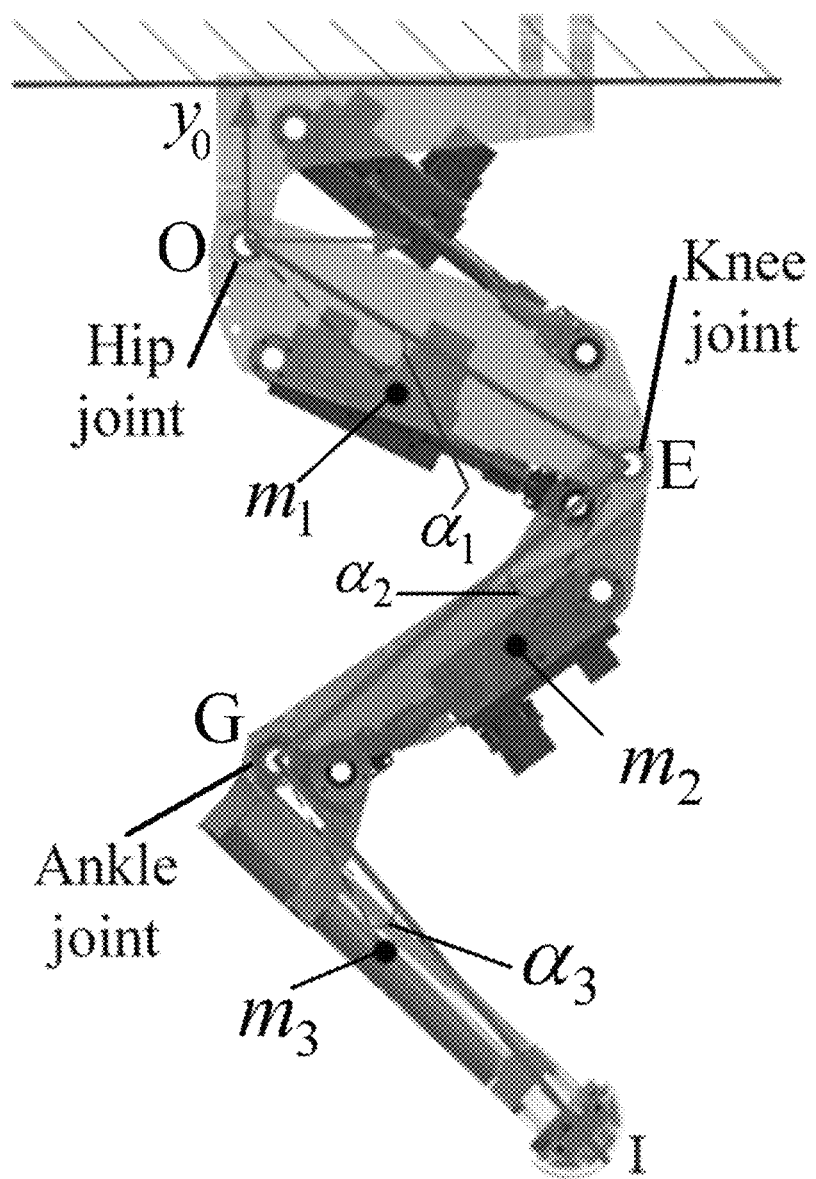
FIG. 8 is a schematic diagram of a leg dynamics model in an embodiment of the present disclosure.

FIG. 8 is a schematic diagram of the leg dynamics model. In a motion process of the leg of the robot, a centroid position of the hydraulic drive unit of each joint does not change greatly. Therefore, a change of the centroid position in the motion process is ignored in the present disclosure.

Based on a geometrical relationship in FIG. 3, coordinates $(x_1, y_1)$ of a centroid of the thigh member OE can be obtained as follows:

$$\begin{cases} x_1 = p_1 \cos(\theta_1 + \alpha_1) \\ y_1 = p_1 \sin(\theta_1 + \alpha_1) \end{cases} \quad (13)$$

A moment of inertia of the thigh member OE is defined as $J_1$. Kinetic energy $E_{k1}$ of the thigh member OE and potential energy $E_{p1}$ of the thigh member OE are defined as follows:

$$E_{k1} = \tfrac{1}{2} m_1 v_1^2 + \tfrac{1}{2} J_1 \dot{\theta}_1^2 = \tfrac{1}{2} m_1 (p_1 \dot{\theta}_1)^2 + \tfrac{1}{2} J_1 \dot{\theta}_1^2$$

$$E_{p1} = m_1 g p_1 \sin(\theta_1 + \alpha_1) \quad (14)$$

As described above, g represents an acceleration of gravity (9.8 m/s²).

Based on the geometrical relationship in FIG. 3, coordinates $(x_2, y_2)$ of a centroid of the crus member EG can be obtained as follows:

$$\begin{cases} x_2 = l_1 \cos(\theta_1) + p_2 \cos(\theta_1 + \theta_2 + \alpha_2) \\ y_2 = l_1 \sin(\theta_1) + p_2 \sin(\theta_1 + \theta_2 + \alpha_2) \end{cases} \quad (15)$$

A moment of inertia of the crus member EG is defined as $J_2$. Kinetic energy $E_{k2}$ of the crus member EG and potential energy $E_{p2}$ of the crus member EG are defined as follows:

$$E_{k2} = \tfrac{1}{2} m_2 (l_1 \dot{\theta}_1)^2 + \tfrac{1}{2} m_2 p_2^2 (\dot{\theta}_1 + \dot{\theta}_2)^2 + m_2 l_1 p_2 (\dot{\theta}_1^2 + \dot{\theta}_1 \dot{\theta}_2) \cos(\theta_2 + \alpha_2) + \tfrac{1}{2} J_2 (\dot{\theta}_1 + \dot{\theta}_2)^2$$

$$E_{p2} = m_2 g l_1 \sin(\theta_1) + m_2 g p_2 \sin(\theta_1 + \theta_2 + \alpha_2) \quad (16)$$

Based on the geometrical relationship in FIG. 3, coordinates $(x_3, y_3)$ of a centroid of the foot member GI can be obtained as follows:

$$\begin{cases} x_3 = l_1 \cos\theta_1 + l_2 \cos(\theta_1 + \theta_2) + p_3 \cos(\theta_1 + \theta_2 + \theta_3 + \alpha_3) \\ y_3 = l_1 \sin\theta_1 + l_2 \sin(\theta_1 + \theta_2) + p_3 \sin(\theta_1 + \theta_2 + \theta_3 + \alpha_3) \end{cases} \quad (17)$$

A moment of inertia of the foot member GI is defined as $J_3$. Kinetic energy $E_{k3}$ of the foot member GI and potential energy $E_{p3}$ of the foot member GI are defined as follows:

$$E_{k3} = \frac{1}{2}m_3 \left( \begin{pmatrix} \dot{\theta}_1 l_1 \cos\theta_1 + l_2(\dot{\theta}_1 + \dot{\theta}_2)\cos(\theta_1 + \theta_2) + \\ p_3(\dot{\theta}_1 + \dot{\theta}_2 + \dot{\theta}_3)\cos(\theta_1 + \theta_2 + \theta_3 + \alpha_3) \end{pmatrix}^2 + \begin{pmatrix} \dot{\theta}_1 l_1 \sin\theta_1 + l_2(\dot{\theta}_1 + \dot{\theta}_2)\sin(\theta_1 + \theta_2) + \\ p_3(\dot{\theta}_1 + \dot{\theta}_2 + \dot{\theta}_3)\sin(\theta_1 + \theta_2 + \theta_3 + \alpha_3) \end{pmatrix}^2 \right) \quad (18)$$

$$\frac{1}{2}J_3(\dot{\theta}_1 + \dot{\theta}_2 + \dot{\theta}_3)^2$$

$$E_{p3} = m_3 g(l_1 \sin\theta_1 + l_2 \sin(\theta_1 + \theta_2) + p_3 \sin(\theta_1 + \theta_2 + \theta_3 + \alpha_3))$$

A Lagrangian dynamics equation is as follows:

$$Q_j = \frac{d}{dt}\left(\frac{\partial L}{\partial \dot{q}_j}\right) - \frac{\partial L}{\partial q_j} \quad (19)$$

As described above, $Q_j$ represents generalized force in generalized coordinates, L represents a Lagrangian function, and $q_j$ represents a joint variable.

An expression of the Lagrangian function L in the equation (19) is as follows:

$$L = E_k - E_p = E_{k1} + E_{k2} + E_{k3} - E_{p1} - E_{p2} - E_{p3} \quad (20)$$

Based on the Lagrangian dynamics equation, a mathematical relationship of inverse dynamics of a leg structure of the robot is obtained as follows:

$$\begin{bmatrix} \tau_1 \\ \tau_2 \\ \tau_3 \end{bmatrix} = \begin{bmatrix} D_{111} & D_{112} & D_{113} \\ D_{121} & D_{122} & D_{123} \\ D_{131} & D_{132} & D_{133} \end{bmatrix} \begin{bmatrix} \ddot{\theta}_1 \\ \ddot{\theta}_2 \\ \ddot{\theta}_3 \end{bmatrix} + \quad (21)$$

$$\begin{bmatrix} 0 & D_{212} & D_{213} \\ D_{221} & 0 & D_{223} \\ D_{231} & D_{232} & 0 \end{bmatrix} \begin{bmatrix} \dot{\theta}_1 \\ \dot{\theta}_2 \\ \dot{\theta}_3 \end{bmatrix} + \begin{bmatrix} D_{311} & D_{312} & D_{313} \\ 0 & D_{322} & D_{323} \\ D_{331} & 0 & 0 \end{bmatrix} \begin{bmatrix} \dot{\theta}_1\dot{\theta}_2 \\ \dot{\theta}_1\dot{\theta}_3 \\ \dot{\theta}_2\dot{\theta}_3 \end{bmatrix} + \begin{bmatrix} D_1 \\ D_2 \\ D_3 \end{bmatrix}$$

In the formula (21):

$$\begin{cases} D_{131} = J_3 + m_3 p_3^2 + m_3 l_1 p_3 \cos(\theta_2 + \theta_3 + \alpha_3) + \\ \qquad m_3 l_2 p_3 \cos(\theta_3 + \alpha_3) \\ D_{132} = J_3 + m_3 p_3^2 + m_3 l_2 p_3 \cos(\theta_3 + \alpha_3) \\ D_{133} = J_3 + m_3 p_3^2 \\ D_{231} = m_3 l_2 p_3 \sin(\theta_3 + \alpha_3) + m_3 l_1 p_3 \sin(\theta_2 + \theta_3 + \alpha_3) \\ D_{232} = m_3 l_2 p_3 \sin(\theta_3 + \alpha_3) \\ D_{331} = 2 m_3 l_2 p_3 \sin(\theta_3 + \alpha_3) \\ D_3 = m_3 g p_3 \cos(\theta_1 + \theta_2 + \theta_3 + \alpha_3) \end{cases} \quad (22)$$

$$\begin{cases} D_{121} = J_2 + J_3 + m_2 p_2^2 + m_3 p_3^2 + m_3 l_2^2 + m_2 l_1 p_2 \\ \cos(\theta_2 + \alpha_2) + m_3 l_1 l_2 \cos\theta_2 + 2 m_3 l_2 p_3 \cos(\theta_3 + \alpha_3 + m_3 l_1 p_3 \\ \cos(\theta_2 + \theta_3 + \alpha_3) \\ D_{122} = J_2 + J_3 + m_2 p_2^2 + m_3 l_2^2 + m_3 p_3^2 + 2 m_3 l_2 p_3 \cos(\theta_3 + \alpha_3) \\ D_{123} = J_3 + m_3 p_3^2 + m_3 l_2 p_3 \cos(\theta_3 + \alpha_3) \\ D_{221} = m_2 l_1 p_2 \sin(\theta_2 + \alpha_2) + m_3 l_1 l_2 \sin\theta_2 + \\ \qquad m_3 l_1 p_3 \sin(\theta_2 + \theta_3 + \alpha_3) \\ D_{223} = -m_3 l_2 p_3 \sin(\theta_3 + \alpha_3) \\ D_{322} = -2 m_3 l_2 p_3 \sin(\theta_3 + \alpha_3) \\ D_{323} = -2 m_3 l_2 p_3 \sin(\theta_3 + \alpha_3) \\ D_2 = m_3 g p_3 \cos(\theta_1 + \theta_2 + \theta_3 + \alpha_3) + m_3 g l_2 \cos(\theta_1 + \theta_2) + \\ \qquad m_2 g p_2 \cos(\theta_1 + \theta_2 + \alpha_2) \end{cases}$$

$$\begin{cases} D_{111} = J_1 + J_2 + J_3 + m_1 p_1^2 + m_2 l_1^2 + m_2 p_2^2 + m_3 p_3^2 + m_3 l_1^2 + \\ \qquad m_3 l_2^2 + 2 m_2 l_1 p_2 \cos(\theta_2 + \alpha_2) + 2 m_3 l_2 \cos(\theta_3 + \alpha_3) + \\ \qquad 2 m_3 l_1 l_2 \cos\theta_2 + 2 m_3 l_1 p_3 \cos(\theta_2 + \theta_3 + \alpha_3) \\ D_{112} = J_2 + J_3 + m_2 p_2^2 + m_3 p_3^2 + m_3 l_2^2 + m_2 l_1 p_2 \cos(\theta_2 + \alpha_2) + \\ \qquad m_3 l_1 l_2 \cos\theta_2 + 2 l_2 m_3 p_3 \cos(\theta_3 + \alpha_3) + l_1 m_3 p_3 \cos(\theta_2 + \theta_3 + \alpha_3) \\ D_{113} = J_3 + m_3 p_3^2 + m_3 l_2 p_3 \cos(\theta_3 + \alpha_3) \\ \qquad + m_3 l_1 p_3 \cos(\theta_2 + \theta_3 + \alpha_3) \\ D_{212} = -(m_3 l_1 l_2 \sin\theta_2 + m_2 l_1 p_2 \sin(\theta_2 + \alpha_2) + m_3 l_1 p_3 \\ \qquad \sin(\theta_2 + \theta_3 + \alpha_3)) \\ D_{213} = -(m_3 l_2 p_3 \sin(\theta_3 + \alpha_3) + m_3 l_1 p_3 \sin(\theta_2 + \theta_3 + \alpha_3)) \\ D_{311} = -(2 m_2 l_1 p_2 \sin(\theta_2 + \alpha_2) + 2 m_3 l_1 l_2 \sin\theta_2 + 2 m_3 l_1 p_3 \\ \qquad \sin(\theta_2 + \theta_3 + \alpha_3)) \\ D_{312} = -(2 m_3 l_2 p_3 \sin(\theta_3 + \alpha_2) + 2 m_3 l_1 p_3 \sin(\theta_2 + \theta_3 + \alpha_3)) \\ D_{313} = -(2 m_3 l_2 p_3 \sin(\theta_3 + \alpha_3) + m_3 l_1 p_3 \sin(\theta_2 + \theta_3 + \alpha_3) + \\ \qquad m_3 l_1 p_3 \sin(\theta_2 + \theta_3 + \alpha_3)) \\ D_1 = m_1 g p_1 \cos(\theta_1 + \alpha_1) + m_2 g(l_1 \cos\theta_1 + p_2 \cos(\theta_1 + \theta_2 + \alpha_2)) + \\ \qquad m_3 g \left( l_1 \cos\theta_1 + l_2 \cos(\theta_1 + \theta_2) + p_3 \cos\begin{pmatrix} \theta_1 + \theta_2 + \\ \theta_3 + \alpha_3 \end{pmatrix} \right) + \\ \qquad m_3 l_1 l_2 \cos(\theta_2) \end{cases}$$

Step 2: Describe the hydraulic drive system of the leg and an impedance control principle of the hydraulic drive system. Based on the leg kinematics model, the leg statics model, and the leg dynamics model, select different impedance control methods for different joints to generate multiple impedance configuration schemes and obtain an implementation principle of each impedance configuration.

Figure 9:
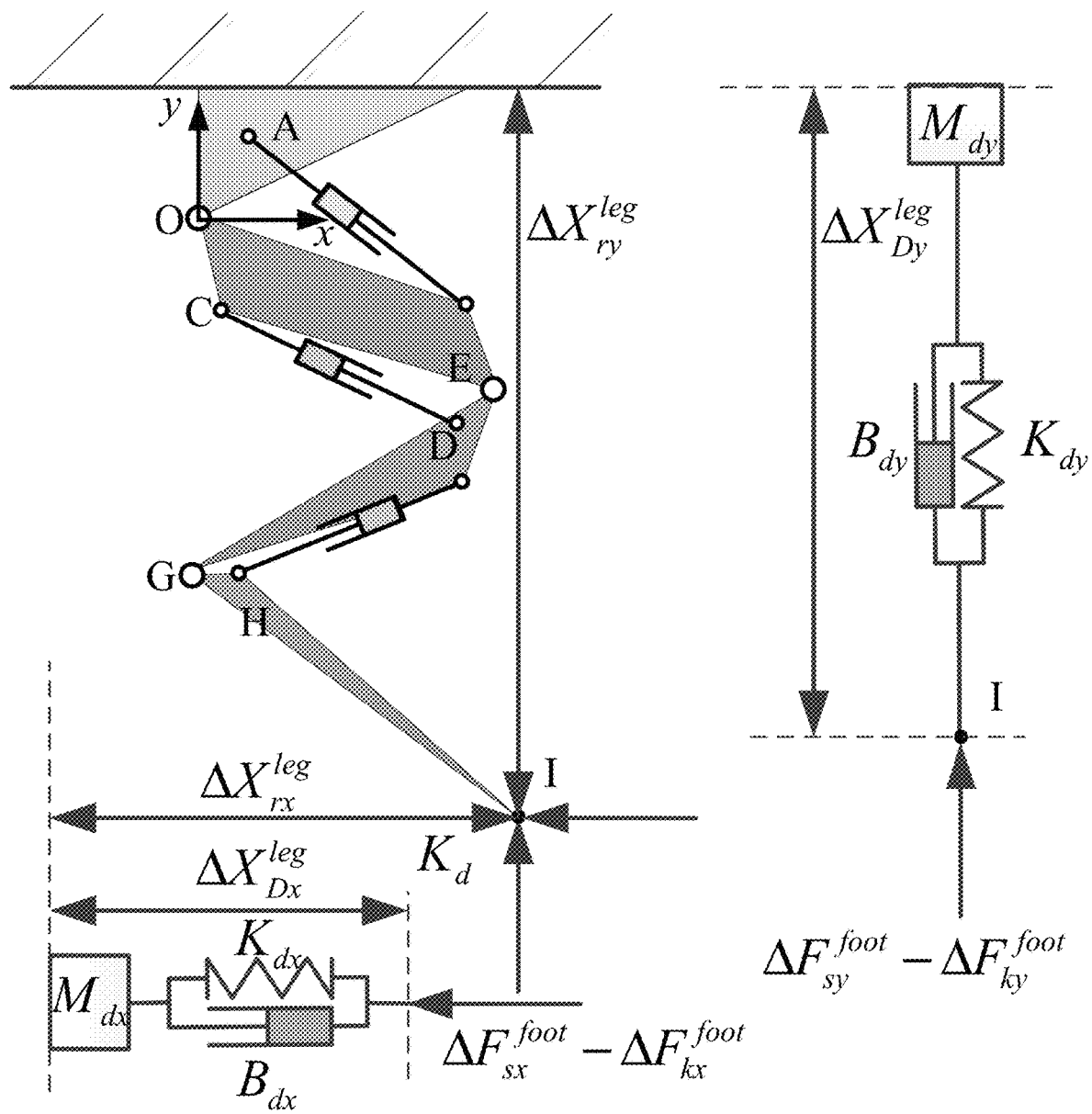
FIG. 9 is a schematic diagram of an impedance characteristic of a hydraulic drive system of a leg in an embodiment of the present disclosure.

FIG. 9 is a schematic diagram of an impedance characteristic of the hydraulic drive system of the leg. Impedance control is a main method for implementing compliance control of the robot. Impedance control is implemented for the hydraulic drive system of the leg by adjusting an impedance characteristic $Z_D$ (including desired mass $M_D$, a desired damping $B_D$, and desired stiffness $K_D$) of the leg, to enable the system to have the desired impedance characteristic shown in FIG. 9.

It can be learned from FIG. 9 that a relational expression of acting force between the foot position of the robot and an environment is as follows:

$$\begin{cases} M_{Dx}\left(\Delta \ddot{X}_{Dx}^{leg} - \Delta \ddot{X}_{rx}^{leg}\right) + B_{Dx}\left(\Delta \dot{X}_{Dx}^{leg} - \Delta \dot{X}_{rx}^{leg}\right) + K_{Dr}\left(\Delta X_{Dx}^{leg} - \Delta X_{rx}^{leg}\right) = \\ \qquad \Delta F_{sx}^{foot} - \Delta F_{kx}^{foot} \\ M_{Dy}\left(\Delta \ddot{X}_{Dx}^{leg} - \Delta \ddot{X}_{rx}^{leg}\right) + B_{Dy}\left(\Delta \dot{X}_{Dx}^{leg} - \Delta \dot{X}_{rx}^{leg}\right) + K_{Dy}\left(\Delta X_{Dx}^{leg} - \Delta X_{rx}^{leg}\right) = \\ \qquad \Delta F_{sy}^{foot} - \Delta F_{ky}^{foot} \end{cases} \quad (23)$$

Laplace transform is performed on the relational expression (23) to obtain the following:

$$\begin{cases} \Delta X_{Dx}^{leg} - \Delta X_{rx}^{leg} = \dfrac{\Delta F_{sx}^{foot} - \Delta F_{kx}^{foot}}{M_{Dx} s^2 + B_{Dx} s + K_{Dx}} \\ \Delta X_{Dy}^{leg} - \Delta X_{ry}^{leg} = \dfrac{\Delta F_{sy}^{foot} - \Delta F_{ky}^{foot}}{M_{Dy} s^2 + B_{Dy} s + K_{Dy}} \end{cases} \quad (24)$$

or $$\begin{cases} \Delta F_{sx}^{foot} - \Delta F_{kx}^{foot} = \left(M_{Dx} s^2 + B_{Dx} s + K_{Dx}\right)\left(\Delta X_{Dx}^{leg} - \Delta X_{rx}^{leg}\right) \\ \Delta F_{sy}^{foot} - \Delta F_{ky}^{foot} = \left(M_{Dy} s^2 + B_{Dy} s + K_{Dy}\right)\left(\Delta X_{Dy}^{leg} - \Delta X_{ry}^{leg}\right) \end{cases} \quad (25)$$

The formulas (24) and (25) have the same leg impedance characteristic, but are applicable to different systems. The formula (24) is applicable to position-based impedance control. That is, when disturbing force $\Delta F_{sx}^{foot} - \Delta F_{kx}^{foot}$ and disturbing force $\Delta F_{sy}^{foot}$-$\Delta F_{ky}^{foot}$ are applied to the foot, position errors $\Delta X_{Dx}^{leg}$-$\Delta X_{rx}^{leg}$ and $\Delta X_{Dy}^{leg}$-$\Delta X_{ry}^{leg}$ are generated for the foot due to the desired impedance characteristic of the leg, to balance the disturbing force $\Delta F_{sx}^{foot}$-$\Delta F_{kx}^{foot}$ and the disturbing force $\Delta F_{sy}^{foot}$-$\Delta F_{ky}^{foot}$. The formula (25) is applicable to force-based impedance control. That is, when disturbing positions $\Delta X_{Dx}^{leg}$-$\Delta X_{rx}^{leg}$ and $\Delta X_{Dy}^{leg}$-$\Delta X_{ry}^{leg}$ are applied to the foot, force errors $\Delta F_{sx}^{foot}$-$\Delta F_{kx}^{foor}$ and $\Delta F_{sy}^{foot}$-$\Delta F_{ky}^{foot}$ are generated for the foot due to the desired impedance characteristic of the leg, to balance the disturbing positions $\Delta X_{Dx}^{leg}$-$\Delta X_{rx}^{leg}$ and $\Delta X_{Dy}^{leg}$-$\Delta X_{ry}^{leg}$.

Figure 10:
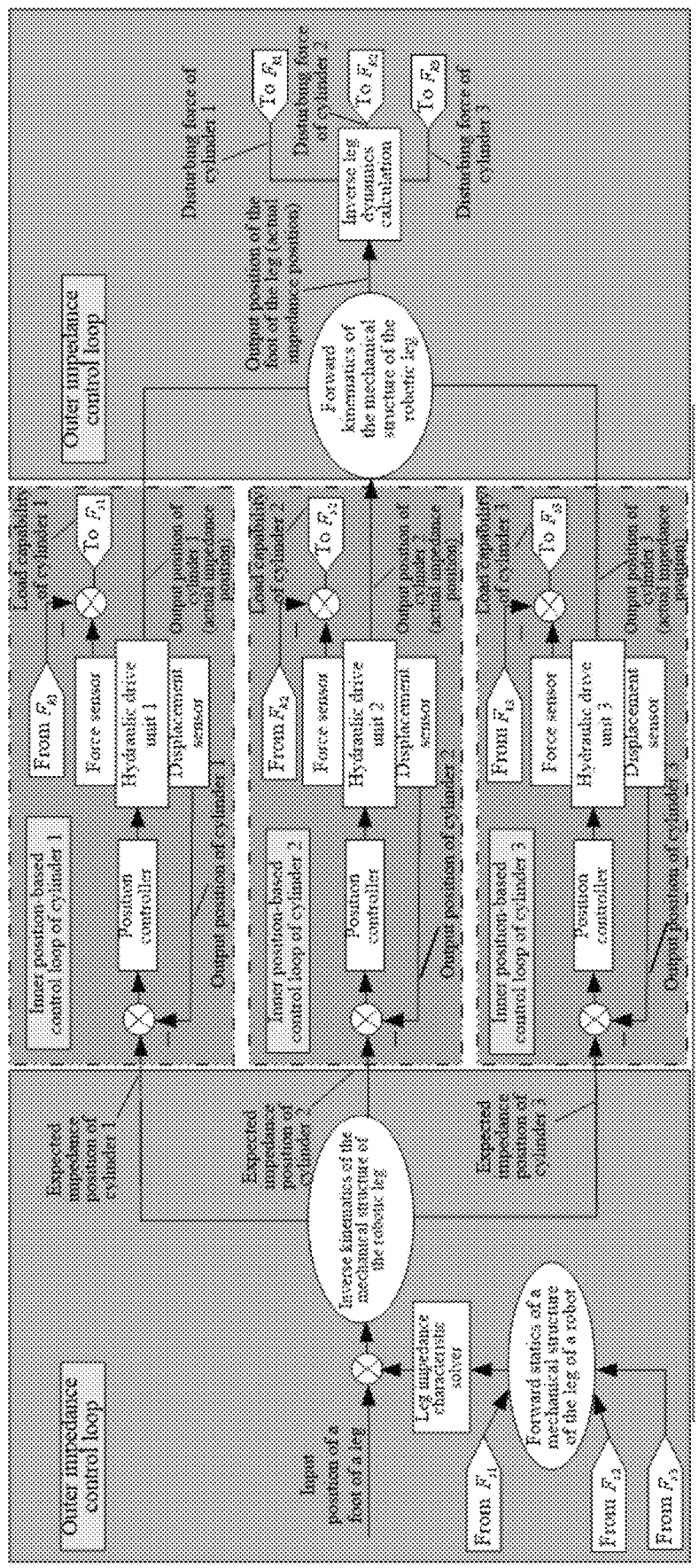
FIG. 10 shows a principle of implementing position-based impedance control for a leg in an embodiment of the present disclosure.
Figure 11:
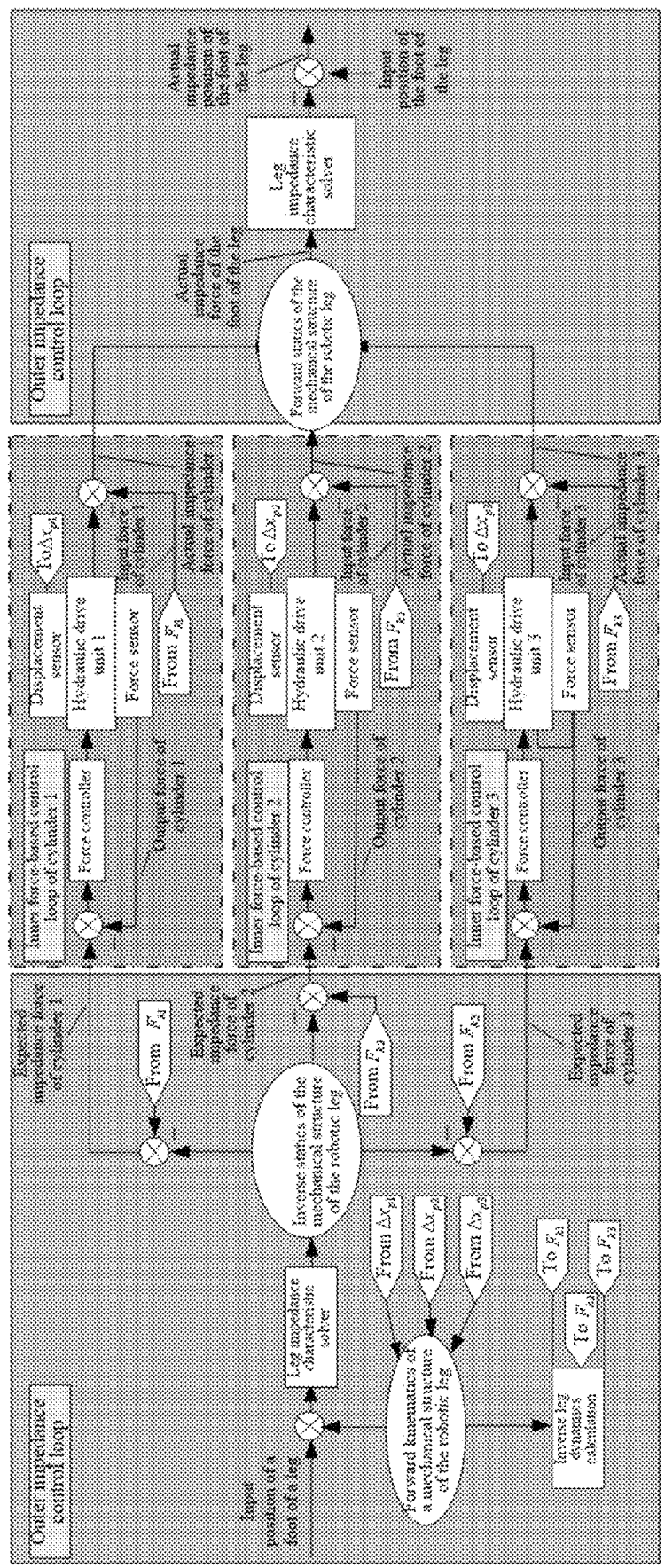
FIG. 11 shows a principle of implementing force-based impedance control for a leg in an embodiment of the present disclosure.
Figure 12:
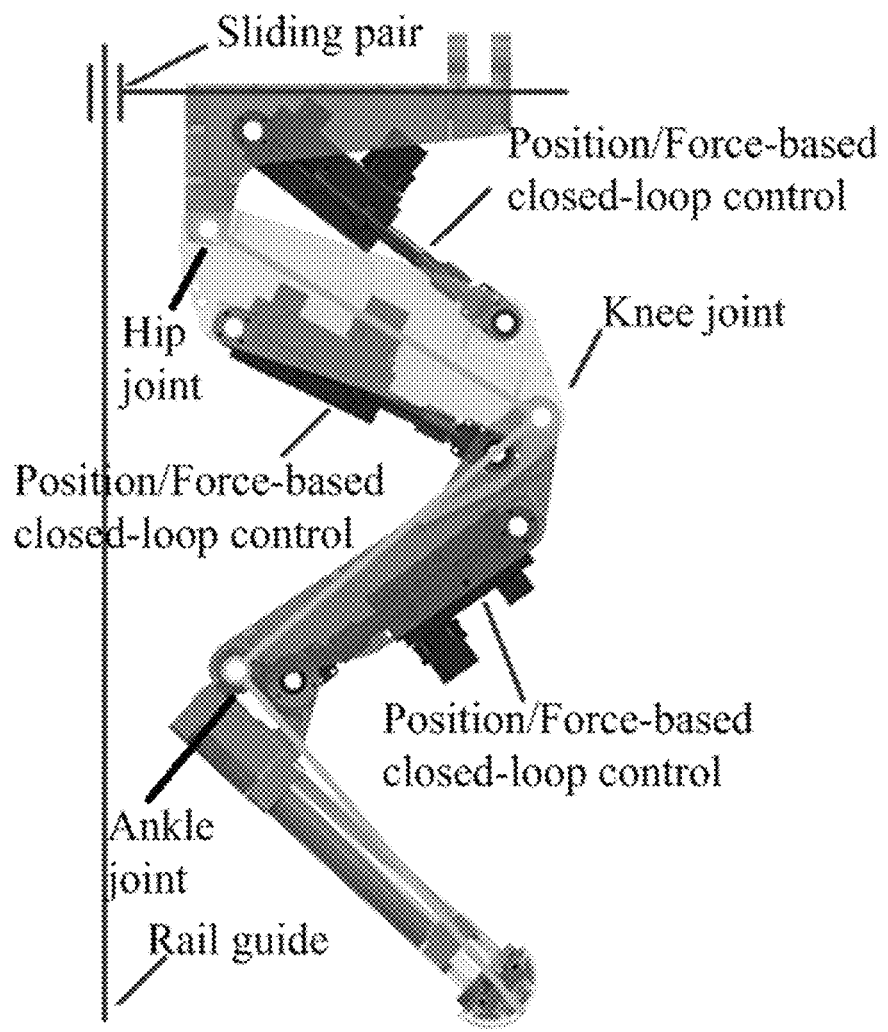
FIG. 12 is a schematic diagram of an impedance configuration scheme for a hydraulic drive system of a leg in an embodiment of the present disclosure.

FIG. 10 and FIG. 11 show principles of implementing position-based/force-based impedance control for the leg. Eight impedance configuration schemes are obtained for the hydraulic drive system of the leg based on FIG. 12. For details, refer to Table 2.

joint, to obtain the disturbing force ($\Delta F_{sx}^{foot}$-$\Delta F_{kx}^{foot}$, $\Delta F_{sy}^{foot}$-$\Delta F_{ky}^{foot}$) that the foot suffers. Then, a leg impedance characteristic solver ($Z_{Dx}=M_{Dx}s^2+B_{Dx}s+K_{Dx}$, $Z_{Dy}=M_{Dy}s^2+B_{Dy}s+K_{Dy}$) is used to obtain a foot position variation ($\Delta X_{Dx}^{leg}$-$\Delta X_{rx}^{leg}$, $\Delta X_{Dy}^{leg}$-$\Delta X_{ry}^{leg}$) corresponding to the disturbing force that the foot suffers. Finally, variations of input signals of inner position-based control loops of the hydraulic drive units of the hip joint, the knee joint, and the ankle joint are obtained by using inverse leg kinematics and the mapping between the elongation of the hydraulic drive unit of each joint and the rotation angle of each joint.

(2) In the outer impedance control loop, convert a position signal of an external load into a variation of an input signal of an inner force-based control loop of each joint. When the foot suffers a disturbing position, position sensors of the hydraulic drive units of the hip joint, the knee joint, and the

TABLE 2

Impedance configuration schemes for the hydraulic drive system of the leg

| Scheme | Hip joint | | Knee joint | | Ankle joint | |
|---|---|---|---|---|---|---|
| | Position-base | Force-base | Position-base | Force-base | Position-base | Force-base |
| 1 | • | | • | | • | |
| 2 | | • | | • | | • |
| 3 | • | | • | | | • |
| 4 | • | | | • | • | |
| 5 | | • | • | | • | |
| 6 | • | | | • | | • |
| 7 | | • | | • | • | |
| 8 | | • | • | | | • |

FIG. 13 shows a principle of implementing an impedance configuration scheme for the hydraulic drive system of the leg. As shown in FIG. 13, the implementation of the impedance configuration scheme for the hydraulic drive system of the leg includes three parts: an outer impedance control loop, an inner impedance control loop, and a module for switching between inner-loop position-based impedance control and inner-loop force-based impedance control. An implementation principle of a module for switching between inner-loop position-based impedance control and inner-loop force-based impedance control in cylinder 1 is used as an example. When $C_1$ is set to a value greater than 0, a switching switch sets $S_1$ to 1. Therefore, $|S_1-1|=0$. In this case, position-based control is performed on the inner impedance control loop. When $C_1$ is set to a value equal to or less than 0, the switching switch sets $S_1$ to 0. Therefore, $|S_1-1|=1$. In this case, force-based control is performed on the inner impedance control loop.

As shown in FIG. 13, the impedance configuration scheme for the hydraulic drive system of the leg is implemented according to the following four steps:

(1) In the outer impedance control loop, convert a disturbing force signal of the foot into a variation of an input signal of an inner position-based control loop of each joint. When the foot suffers disturbing force, a force sensor of the hydraulic drive unit of each joint detects the force signal. A disturbing force component of the foot in the signal detected by the force sensor of the hydraulic drive unit of each point is obtained by using inverse leg dynamics. Forward calculation is performed by using leg statics, the mapping between the elongation of the hydraulic drive unit of each joint and the rotation angle of each joint, and the mapping among the force applied to the hydraulic drive unit of each joint, the rotation angle of each joint, and the torque of each ankle joint each detect a position signal. Forward calculation is performed by using the leg kinematics model and the mapping between the elongation of the hydraulic drive unit of each joint and the rotation angle of each joint, to obtain a position signal of the foot. An error between an input position of the foot and an actual position of the foot is used as a desired outer-loop position of the foot. Then, the leg impedance characteristic solver is used to convert the desired outer-loop position of the foot into a corresponding desired force signal of foot impedance. Inverse calculation is performed on the desired force signal of the foot impedance by using the leg statics model, the mapping between the elongation of the hydraulic drive unit of each joint and the rotation angle of each joint, and the mapping among the force applied to the hydraulic drive unit of each point, the rotation angle of each joint, and the torque of each joint, to obtain variations of input signals of inner force-based control loops of the hydraulic drive units of the hip joint, the knee joint, and the ankle joint.

(3) Set values of $C_1$, $C_2$, and $C_3$ in advance to switch between inner-loop position-based impedance control and inner-loop force-based impedance control for cylinders 1, 2, and 3.

(4) Based on the signals detected by the position sensors of the hydraulic drive units of the hip joint, the knee joint, and the ankle joint, and the signals detected by the force sensors of the hydraulic drive units of the hip joint, the knee joint, and the ankle joint, obtain the actual position and a force variation of the foot of the leg by using forward leg structure kinematics and forward leg structure statics, the mapping between the elongation of the hydraulic drive unit of each joint and the rotation angle of each joint, and the mapping among the force applied to the hydraulic drive unit of each joint, the rotation angle of each joint, and the torque of each joint.

Step 3: Analyze distribution of equivalent mass of the hydraulic drive unit of each joint within motion space of the foot when the hydraulic drive system of the leg is in a swing phase state and a stance phase state. An optimal inner-loop impedance control mode is selected for each joint of the leg based on different distribution of the equipment mass and different external disturbance characteristics of the hydraulic drive unit of each joint within the motion space of the foot in the swing phase state and the stance phase state, and influence of the distribution of the equivalent mass on impedance control performance of the hydraulic drive unit of the joint. Finally, a novel impedance configuration is obtained for the 3DOF leg of the hydraulically-driven legged robot.

In the motion process of the robot, the hydraulic drive system of the leg may be in the swing phase state and the stance phase state. Therefore, in the present disclosure, swing phase equivalent mass and stance phase equivalent mass are separately calculated for the hydraulic drive unit of each joint in the hydraulic drive system of the leg.

Figure 14:
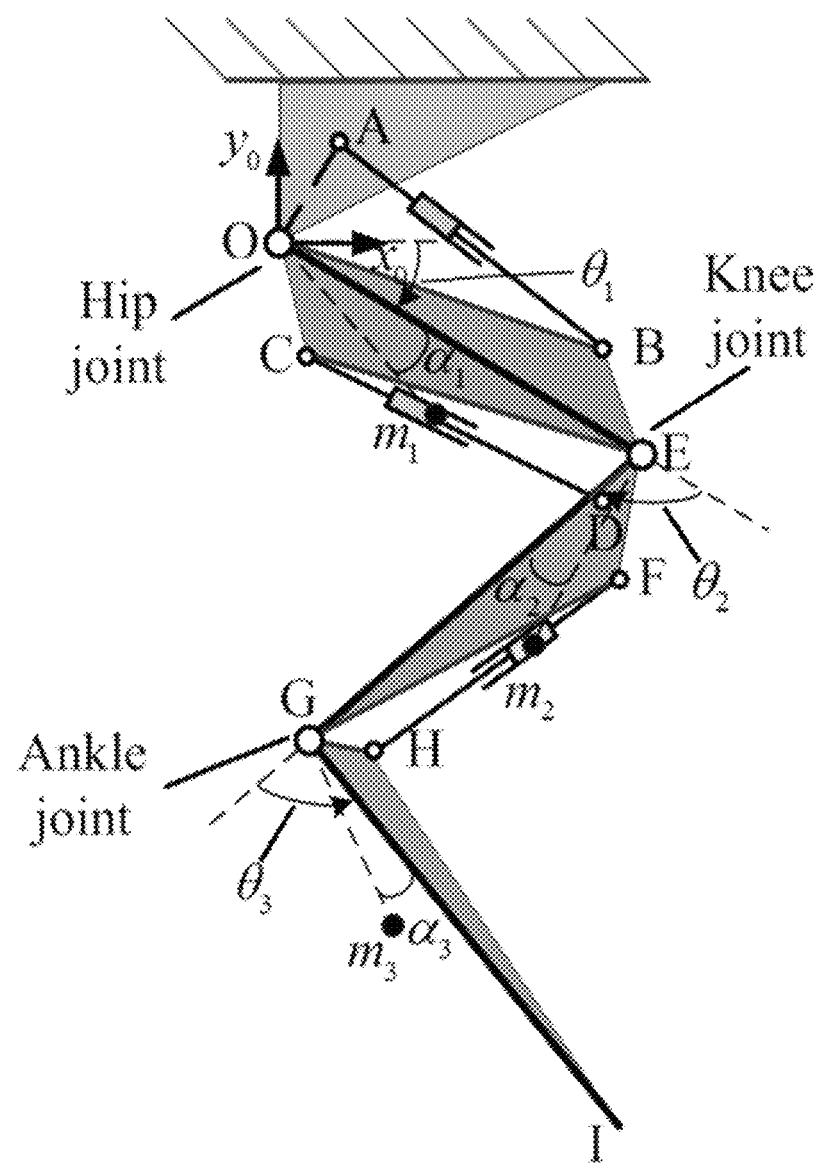
FIG. 14 is a schematic structural diagram of a hydraulic drive system of a leg in a swing phase state in an embodiment of the present disclosure.

FIG. 14 is a schematic structural diagram of the hydraulic drive system of the leg in the swing phase state.

According to the formula (6), a relationship between rotation speed of the hip joint and motion speed of the hydraulic drive unit of the hip joint is as follows:

$$\frac{\dot{\theta}_1}{v_1} = \frac{\frac{l_{01} + \Delta x_{p1}}{OA \cdot OB}}{\sqrt{1 - \left(\frac{OA^2 + OB^2 - (l_{01} + \Delta x_{p1})^2}{2 \cdot OA \cdot OB}\right)^2}} \quad (26)$$

Kinetic energy $E_{kt1}$ of rotation of the thigh member, the crus member, and the foot member around the hip joint is as follows:

$$E_{kt1} = \frac{1}{2}(J_1 + J_2 + J_3 + m_1 p_1^2 + m_2(l_1^2 + p_2^2 + 2l_1 p_2 \cos(\theta_2 + \alpha_2)) + m_3(l_1^2 + l_2^2 + p_3^2 + 2l_1 l_2 \cos(\theta_2) + 2l_1 p_3 \cos(\theta_2 + \theta_3 + \alpha_3) + 2l_2 p_3 \cos(\theta_3 + \alpha_3)))\dot{\theta}_1^2 \quad (27)$$

According to the formula (27) and a principle of constant kinetic energy, the following can be obtained:

$$E_{kt1} = \frac{1}{2} m_{Lt1} v_1^2 \quad (28)$$

As described above, $m_{Lt1}$ represents equivalent mass of rotation of the thigh member, the crus member, and the foot member around the hip joint.

According to the formulas (26), (27), and (28), the equivalent mass $m_{Lt1}$ of rotation of the thigh member, the crus member, and the foot member around the hip joint is as follows:

$$m_{Lt1} = \frac{(J_1 + J_2 + J_3 + m_1 p_1^2 + m_2 l_{12}^2 + m_3 l_{13}^2)(l_{01} + \Delta x_{p1})^2}{(OA \cdot OB)^2 \left(1 - \left(\frac{OA^2 + OB^2 - (l_{01} + \Delta x_{p1})^2}{2 \cdot OA \cdot OB}\right)^2\right)} \quad (29)$$

According to the formula (6), a relationship between rotation speed of the knee joint and motion speed of the hydraulic drive unit of the knee joint is as follows:

$$\frac{\dot{\theta}_2}{v_2} = \frac{\frac{l_{02} + \Delta x_{p2}}{EC \cdot ED}}{\sqrt{1 - \left(\frac{EC^2 + ED^2 - (l_{02} + \Delta x_{p2})^2}{2 \cdot EC \cdot ED}\right)^2}} \quad (30)$$

Kinetic energy $E_{Kt2}$ of rotation of the crus member and the foot member around the knee joint is as follows:

$$E_{kt1} = \frac{1}{2}(J_2 + J_3 + m_2 p_2^2 + m_3(l_2^2 + p_3^2 + 2l_2 p_3 \cos(\theta_3 + \alpha_3))) \dot{\theta}_2^2 \quad (31)$$

According to the formula (31) and the principle of constant kinetic energy, the following can be obtained:

$$E_{kt2} = \frac{1}{2} m_{Lt2} v_2^2 \quad (32)$$

In the formula (32), $m_{Lt2}$ represents equivalent mass of rotation of the crus member and the foot member around the knee joint.

According to the formulas (30), (31), and (32), the equivalent mass $m_{Lt2}$ of rotation of the crus member and the foot member around the knee joint is as follows:

$$m_{Lt2} = \frac{(J_2 + J_3 + m_2 p_2^2 + m_3 l_{23}^2)(l_{02} + \Delta x_{p2})^2}{(EC \cdot ED)^2 \left(1 - \left(\frac{EC^2 + ED^2 - (l_{02} + \Delta x_{p2})^2}{2 \cdot EC \cdot ED}\right)^2\right)} \quad (33)$$

According to the formula (6), a relationship between rotation speed of the ankle joint and motion speed of the hydraulic drive unit of the ankle joint is as follows:

$$\frac{\dot{\theta}_3}{v_3} = \frac{\frac{l_{03} + \Delta x_{p3}}{GF \cdot GH}}{\sqrt{1 - \left(\frac{GF^2 + GH^2 - (l_{03} + \Delta x_{p3})^2}{2 \cdot GF \cdot GH}\right)^2}} \quad (34)$$

Kinetic energy $E_{kt3}$ of rotation of the foot member around the ankle joint is as follows:

$$E_{kt3} = \frac{1}{2}(J_3 + m_3 p_3^2)\dot{\theta}_3^2 \quad (35)$$

According to the formula (35) and the principle of constant kinetic energy, the following can be obtained:

$$E_{kt3} = \frac{1}{2} m_{Lt3} v_3^2 \quad (36)$$

In the formula (36), $m_{Lt3}$ represents equivalent mass of rotation of the foot member around the ankle joint.

According to the formulas (34), (35), and (36), the equivalent mass $m_{Lt3}$ of rotation of the foot member around the ankle joint is as follows:

$$m_{Lt3} = \frac{(J_3 + m_3 p_3^2)(l_{03} + \Delta x_{p3})^2}{(GF \cdot GH)^2 \left(1 - \left(\frac{GF^2 + GH^2 - (l_{03} + \Delta x_{p3})^2}{2 \cdot GF \cdot GH}\right)^2\right)} \quad (37)$$

Figure 15:
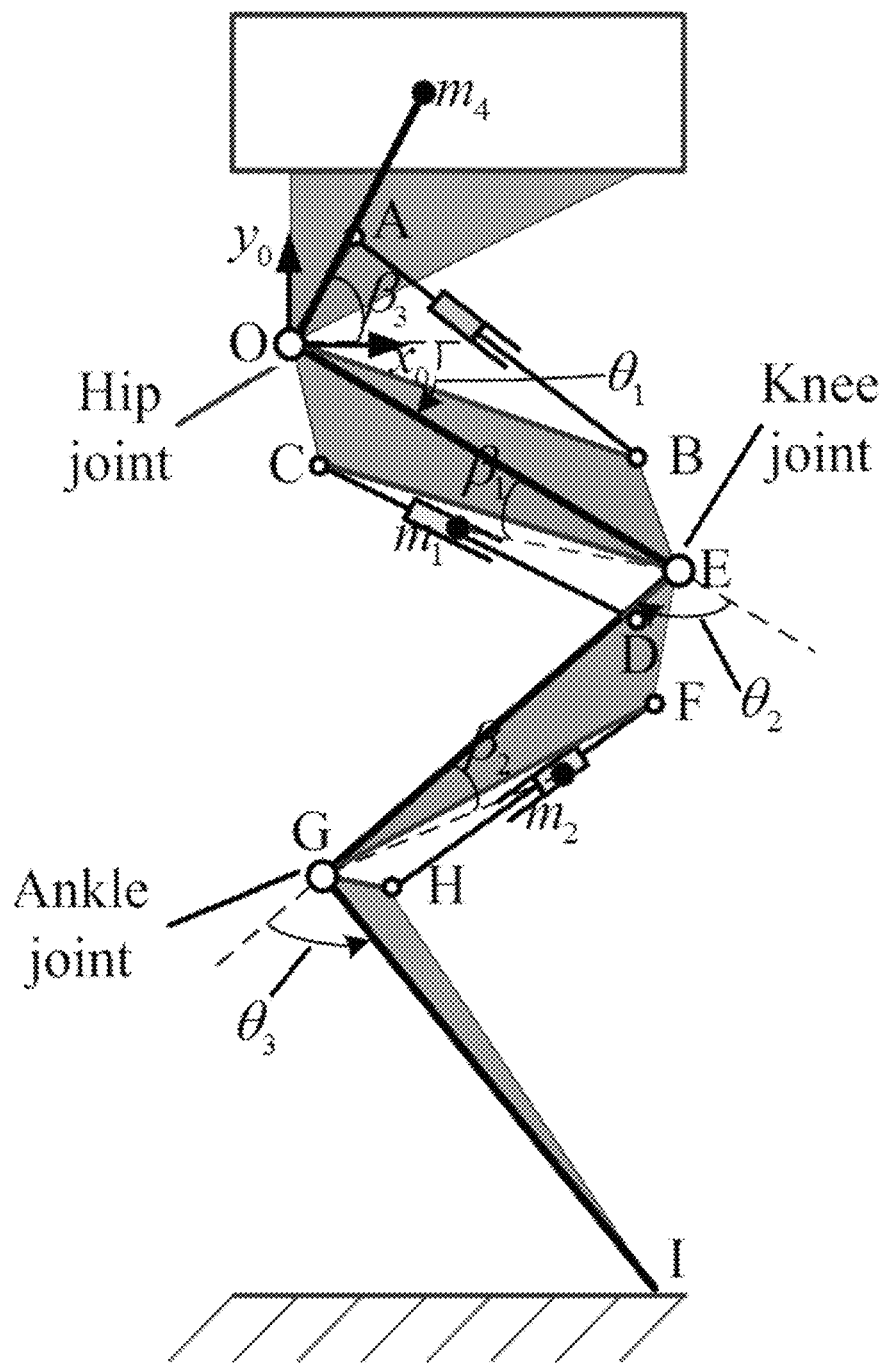
FIG. 15 is a schematic structural diagram of a hydraulic drive system of a leg in a stance phase state in an embodiment of the present disclosure.

As shown in FIG. 15, kinetic energy $E_{kz3}$ of rotation of a base member, the thigh member, and the crus member around the ankle joint is as follows:

$$E_{kz3} = \frac{1}{2}(J_1 + J_2 + J_4 + m_1 l_{31}^2 + m_2 l_{32}^2 + m_4 l_{34}^2)\dot{\theta}_3^2 \quad (38)$$

In the formula (38), $J_4$ represents a moment of inertia of the base member, $l_{31}$ represents a distance between the centroid of the thigh member and the ankle joint, $l_{32}$ represents a distance between the centroid of the crus member and the ankle joint, and $l_{34}$ represents a distance between a centroid of the base member and the ankle joint.

Based on a geometrical relationship in FIG. 15, $l_{31}$ and $l_{34}$ in the formula (38) are as follows:

$$l_{31} = \sqrt{\begin{array}{c}l_1^2 + l_2^2 + p_1^2 + 2l_1l_2\cos(\theta_2) - 2l_1p_1\cos(\alpha_1) - \\ 2l_2p_1\cos(\theta_2 - \alpha_1)\end{array}} \quad (39)$$

$$l_{34} = \sqrt{\begin{array}{c}l_1^2 + l_2^2 + p_4^2 + 2l_1l_2\cos(\theta_2) - 2l_1p_4\cos(\theta_1 - \beta_3) - \\ 2l_2p_4\cos(\theta_1 + \theta_2 - \beta_3)\end{array}}$$

According to the formula (38) and the principle of constant kinetic energy, the following can be obtained:

$$E_{kz3} = \tfrac{1}{2} m_{Lz3} v_3^2 \quad (40)$$

In the formula (40), $m_{Lz3}$ represents equivalent mass of rotation of the base member, the thigh member, and the crus member around the ankle joint.

According to the formulas (38), (39), and (40), the equivalent mass $m_{Lz3}$ of rotation of the base member, the thigh member, and the crus member around the ankle joint is as follows:

$$m_{Lz3} = \frac{(J_1 + J_2 + J_4 + m_1 l_{31}^2 + m_2 l_{32}^2 + m_4 l_{34}^2)}{(GF \cdot GH)^2 \left(1 - \left(\frac{GF^2 + GH^2 - (l_{03} + \Delta x_{p3})^2}{2 \cdot GF \cdot GH}\right)^2\right)} \quad (41)$$

Kinetic energy $E_{kz2}$ of rotation of the base member and the thigh member around the knee joint is as follows:

$$E_{kz2} = \tfrac{1}{2}(J_1 + J_4 + m_1 l_{21}^2 + m_4 l_{24}^2)\dot\theta_2^2 \quad (42)$$

In the formula (42), $l_{21}$ represents a distance between the centroid of the thigh member and the knee joint, and $l_{24}$ represents a distance between the centroid of the base member and the knee joint.

Based on the geometrical relationship in FIG. 15 $l_{24}$ in the formula (42) is as follows:

$$l_{24} = \sqrt{l_1^2 + p_4^2 + 2l_1 p_4 \cos(\beta_3 - \theta_1)} \quad (43)$$

According to the formula (42) and the principle of constant kinetic energy, the following can be obtained:

$$E_{kz2} = \tfrac{1}{2} m_{Lz2} v_2^2 \quad (44)$$

In the formula (44), $m_{Lz2}$ represents equivalent mass of rotation of the base member and the thigh member around the knee joint.

According to the formulas (42), (43), and (44), the equivalent mass $m_{Lz2}$ of rotation of the base member and the thigh member around the knee joint is as follows:

$$m_{Lz2} = \frac{(J_1 + J_4 + m_1 l_{21}^2 + m_4 l_{24}^2)(l_{02} + \Delta x_{p2})^2}{(EC \cdot ED)^2 \left(1 - \left(\frac{EC^2 + ED^2 - (l_{02} + \Delta x_{p2})^2}{2 \cdot EC \cdot ED}\right)^2\right)} \quad (45)$$

Kinetic energy $E_{kz1}$ of rotation of the base member around the hip joint is as follows:

$$E_{kz1} = \tfrac{1}{2}(J_4 + m_4 p_4^2)\dot\theta_1^2 \quad (46)$$

According to the formula (46) and the principle of constant kinetic energy, the following can be obtained:

$$E_{kz1} = \tfrac{1}{2} m_{Lz1} v_1^2 \quad (47)$$

In the formula (47), $m_{Lz1}$ represents equivalent mass of rotation of the base member around the hip joint.

According to the formulas (46) and (47), the equivalent mass $m_{Lz1}$ of rotation of the base member around the hip joint is as follows:

$$m_{Lz1} = \frac{(J_4 + m_4 p_4^2)(l_{01} + \Delta x_{p1})^2}{(OA \cdot OB)^2 \left(1 - \left(\frac{OA^2 + OB^2 - (l_{01} + \Delta x_{p1})^2}{2 \cdot OA \cdot OB}\right)^2\right)} \quad (48)$$

Table 3 lists specific parameters of leg structures in FIG. 14 and FIG. 15.

TABLE 3

Specific parameters in a schematic diagram of the mechanical structure of the hydraulic drive system of the leg

| Parameter | Length (mm) | Parameter | Angle (°) | Parameter | Mass (kg) | Parameter | Moment of inertia (kg · m²) |
|---|---|---|---|---|---|---|---|
| $p_1$ | 155.7751 | $\alpha_1$ | −5.7591 | $m_1$ | 6.9082 | $J_1$ | 0.0526 |
| $p_2$ | 138.7153 | $\alpha_2$ | 16.7343 | $m_2$ | 6.5005 | $J_2$ | 0.0452 |
| $p_3$ | 179.9112 | $\alpha_3$ | −3.9971 | $m_3$ | 4.9153 | $J_3$ | 0.0835 |
| $p_4$ | 127.4765 | $\beta_1$ | 6.1524 | $m_4$ | 3.1498 | $J_4$ | 0.0339 |
| $L_{32}$ | 181.6057 | $\beta_2$ | −12.7050 | | | | |
| $L_{21}$ | 145.8512 | $\beta_3$ | 38.3134 | | | | |

Figure 16:
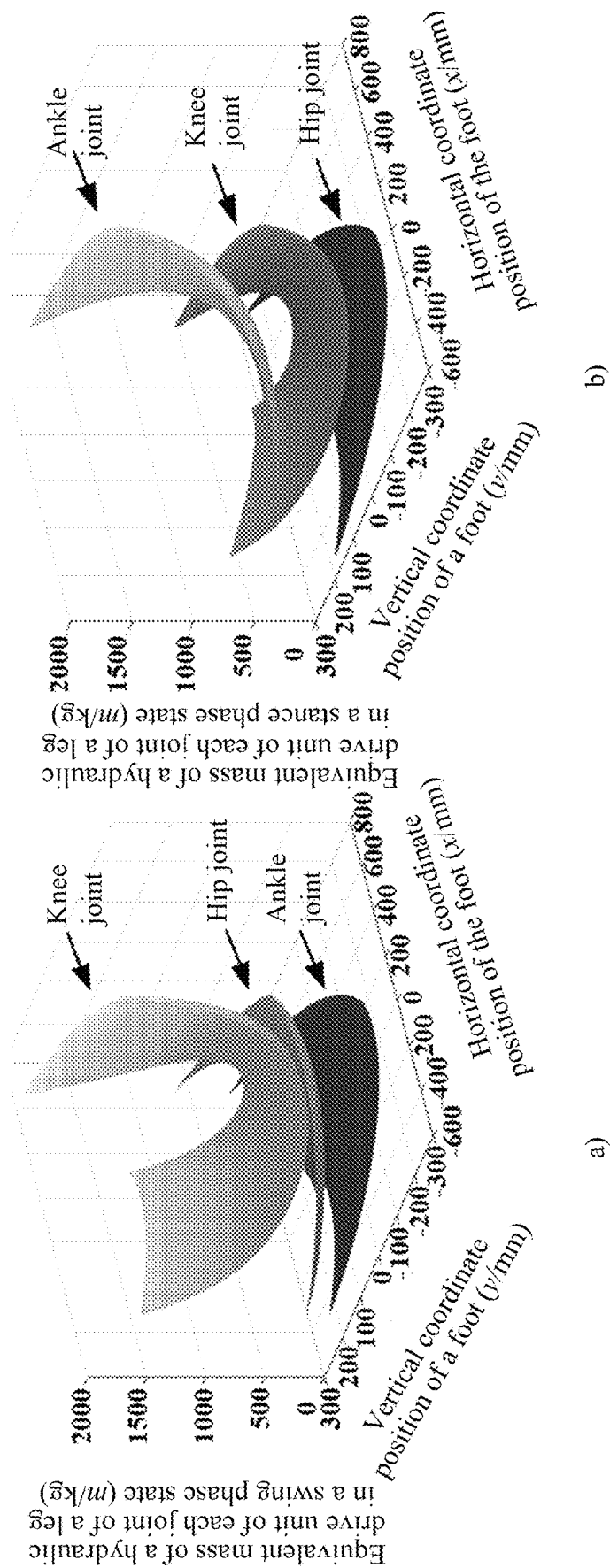
FIG. 16 shows equivalent mass of a hydraulic drive unit of each joint of a leg in an embodiment of the present disclosure.

In the present disclosure, MATLAB is used to obtain the equivalent mass of the hydraulic drive unit of each joint within the motion space of the foot when the hydraulic drive system of the leg is in the swing phase state and the stance phase state, as shown in a) and b) in FIG. 16.

When the hydraulic drive system of the leg is in the stance phase state, only mass of the mechanical structure of the leg is considered. Equivalent mass of the hydraulic drive unit of the knee joint and equivalent mass of the hydraulic drive unit of the ankle joint partially overlap. In an actual working process of the leg of the robot, a body of the robot and the external load are loaded onto the base member. Therefore, a centroid position and mass of the base member are ever-changing. In the present disclosure, three schemes are designed to study a change of the equivalent mass of the hydraulic drive unit of each joint when the centroid position and the mass of the base member are ever-changing.

Figure 17:
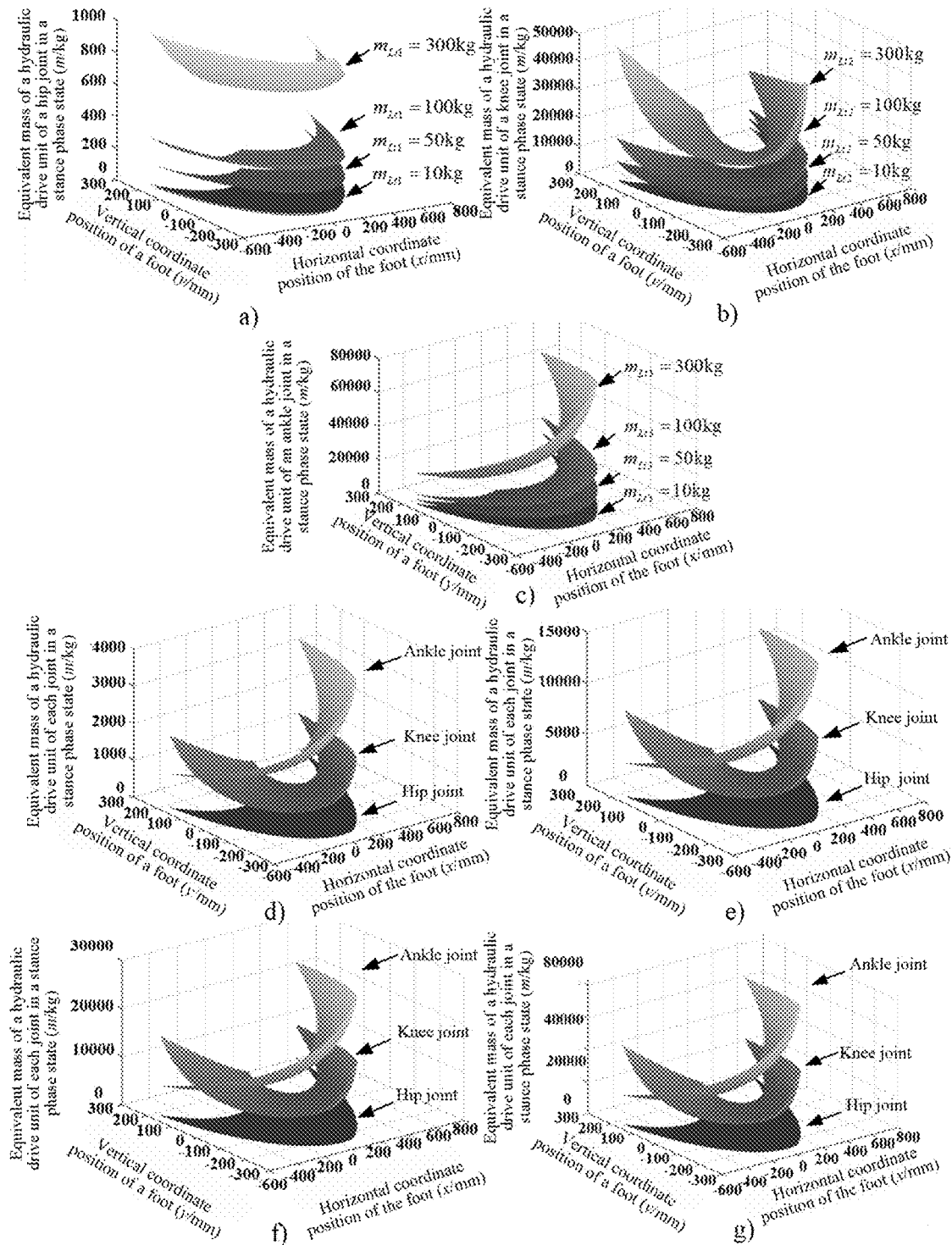
FIG. 17 shows an equivalent mass curve of a hydraulic drive unit of each joint of a leg when a centroid position of a base member keeps unchanged and mass of the base member changes in an embodiment of the present disclosure.

Scheme 1: When the centroid position of the base member keeps unchanged, and the mass $m_4$ of the base member is 10 kg, 50 kg, 100 kg, and 300 kg in sequence, the equivalent mass of the hydraulic drive unit of each joint of the leg is shown in FIG. 17. As shown in FIG. 17, a) to c) show longitudinal change curves of the equivalent mass of each joint when the mass of the base member increases continuously, and d) to g) show horizontal change curves of the equivalent mass of each joint when the mass of the base member increases continuously.

Figure 18:
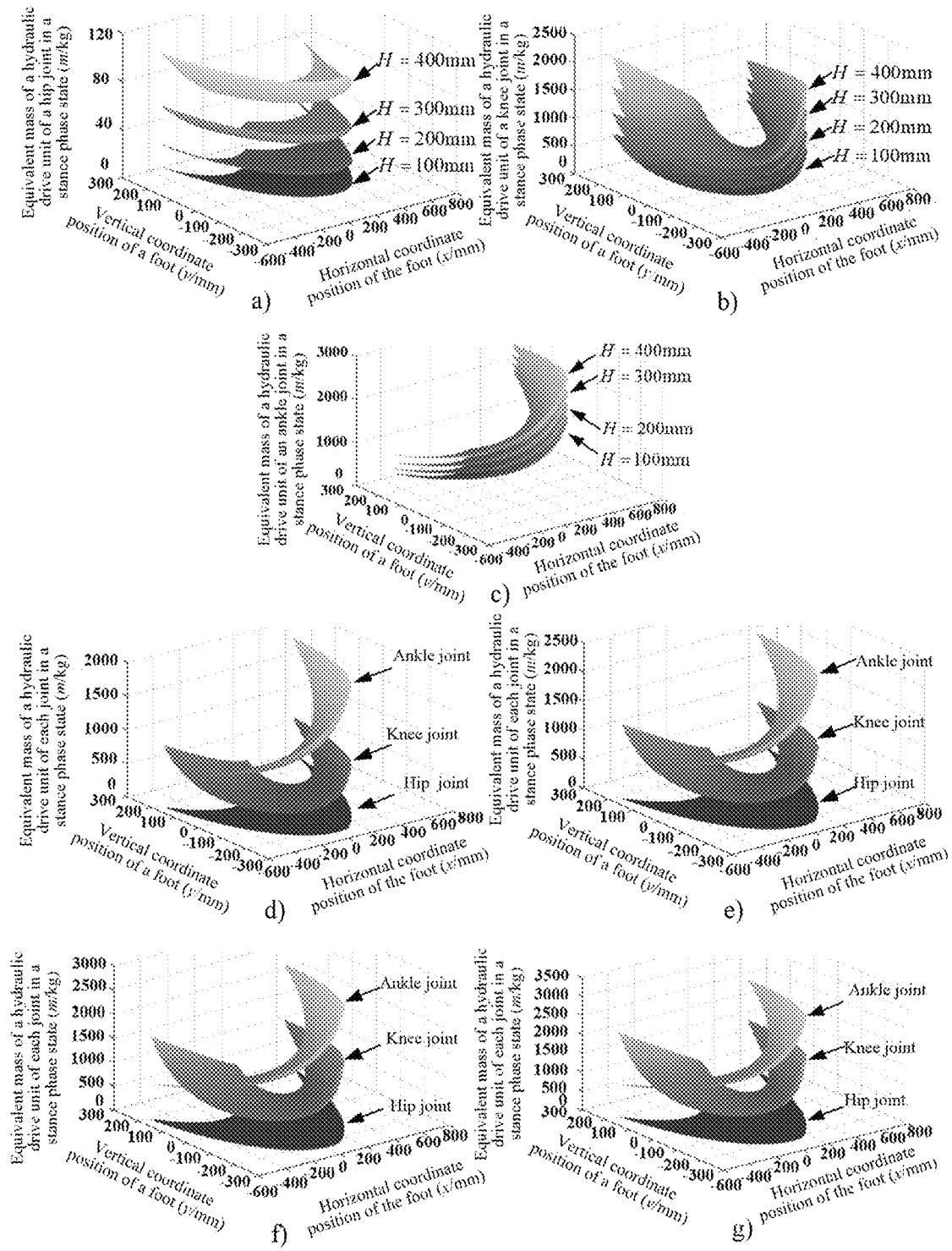
FIG. 18 shows an equivalent mass curve of a hydraulic drive unit of each joint of a leg when mass of a base member keeps unchanged and a centroid height of the base member continuously increases in an embodiment of the present disclosure.

Scheme 2: When the mass $m_4$ of the base member is fixedly 3.1498 kg, a horizontal distance between the centroid of the base member and the origin of the coordinates is fixedly 100.0957 mm, and a vertical distance H between the centroid of the base member and the origin of the coordinates is 100 mm, 200 mm, 300 mm, and 400 mm in sequence, the equivalent mass of the hydraulic drive unit of each joint of the leg is shown in FIG. 18. As shown in FIG. 18, a) to c) show longitudinal change curves of the equivalent mass of each joint when a centroid height of the base member increases continuously, and d) to g) show horizontal change curves of the equivalent mass of each joint when the centroid height of the base member increases continuously.

Figure 19:
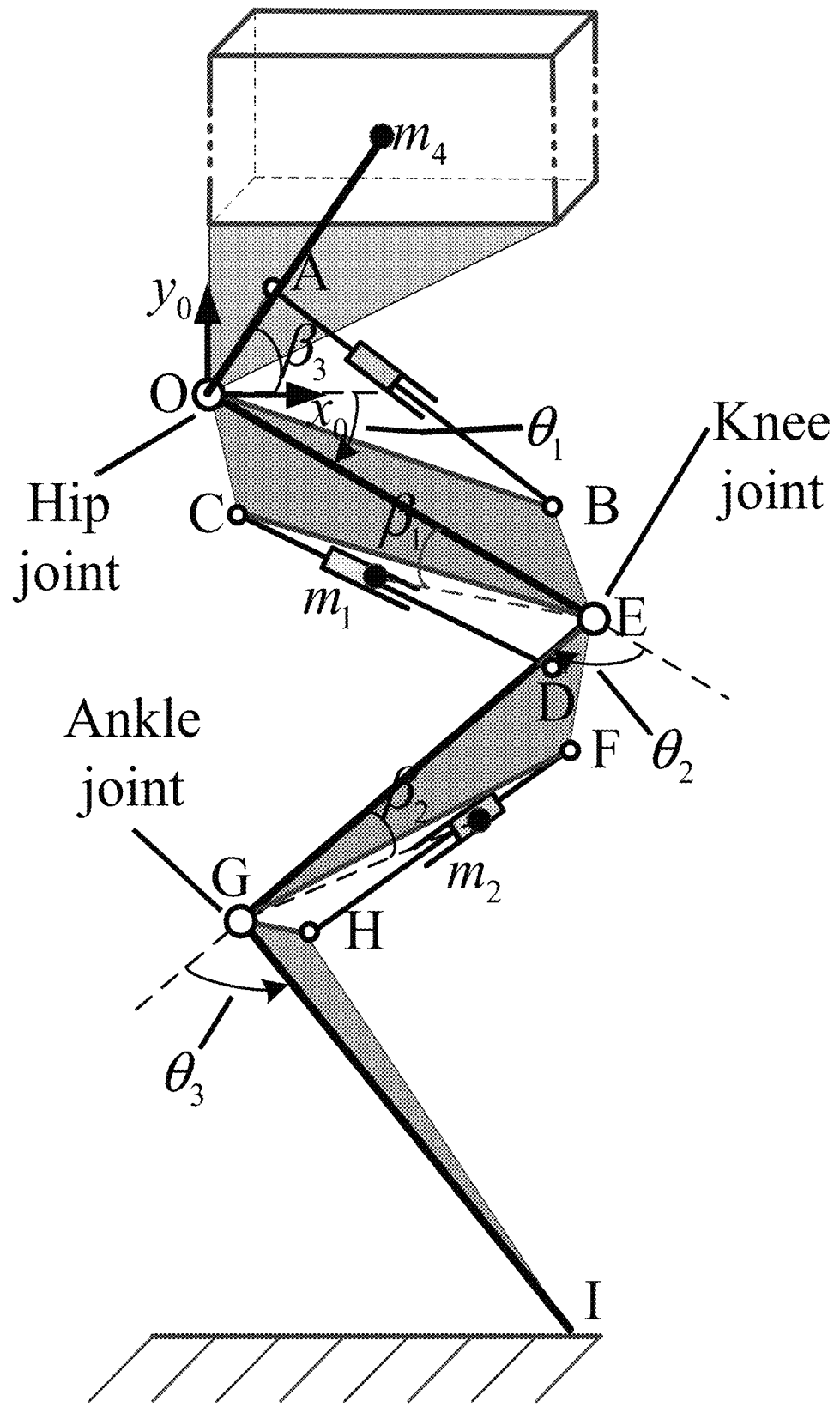
FIG. 19 is a schematic structural diagram of a hydraulic drive system of a leg in a stance phase state when objects with different heights and a same density are loaded in an embodiment of the present disclosure.

Scheme 3: It is assumed that a cuboid with a length of 400 mm, a width of 400 mm, a height of h, and a density of 2700 kg/m³ is loaded onto the base member, as shown in FIG. 19. It is assumed that total mass of the base member and the cuboid is centered on a centroid of the cuboid. When the height h of the cuboid is 100 mm, 200 mm, 300 mm, and 400 mm, parameters of the base member are listed in Table 4.

TABLE 4

Specific parameters of the base member loaded with another member

| Height h (mm) | Angle $\beta_3$ (°) | Mass $m_4$ (kg) | Length $p_4$ (mm) | Moment of inertia $J_4$ (kg·m²) |
|---|---|---|---|---|
| 100 | 55.8610 | 44.0341 | 196.0395 | 0.6276 |
| 200 | 62.5929 | 87.2341 | 239.5273 | 1.4654 |
| 300 | 67.2226 | 130.4341 | 284.9976 | 2.7393 |
| 400 | 70.5657 | 173.6341 | 331.7387 | 4.6653 |

Figure 20:
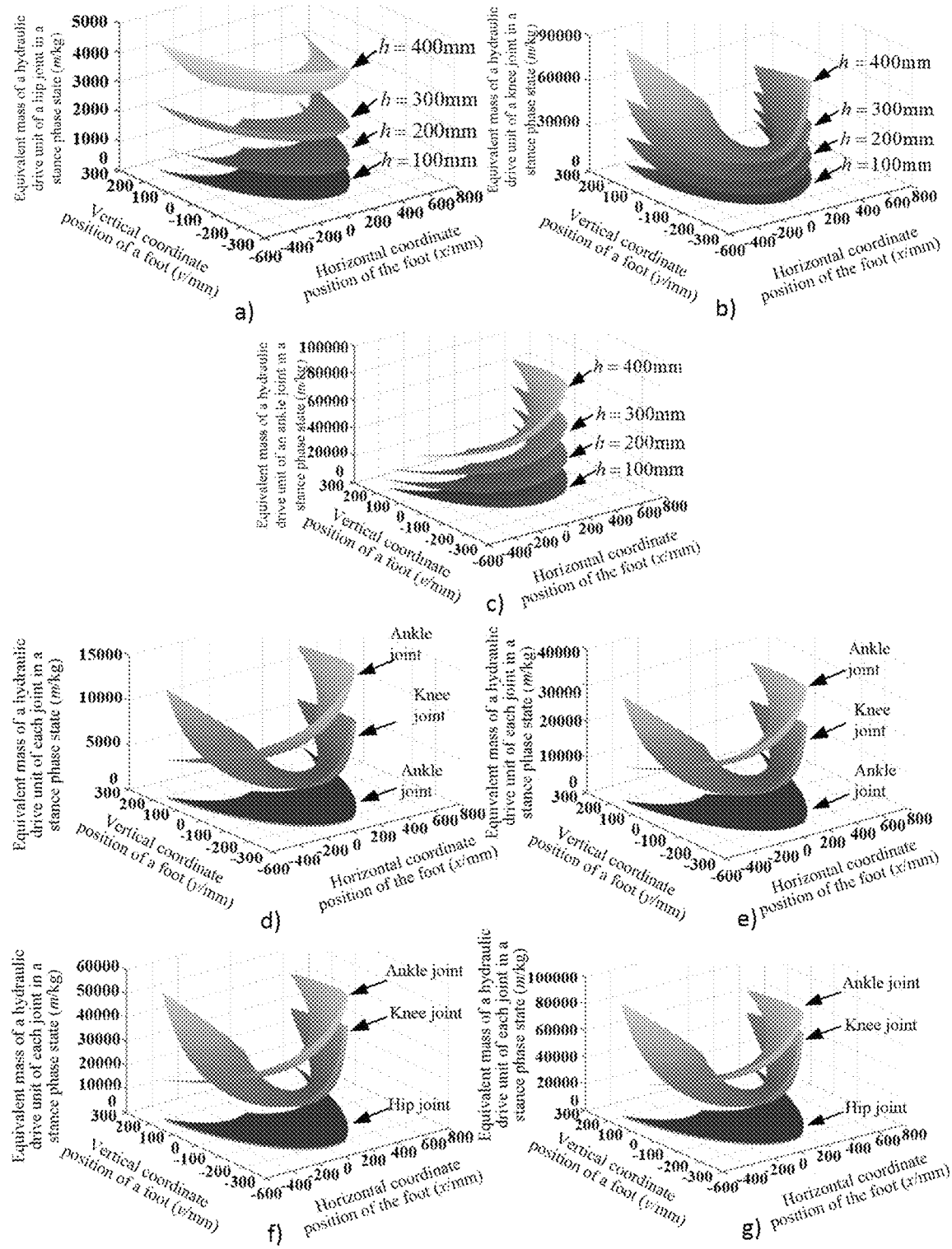
FIG. 20 shows an equivalent mass curve of a hydraulic drive unit of each joint of a leg when heavy objects are loaded in an embodiment of the present disclosure.
Figure 21:
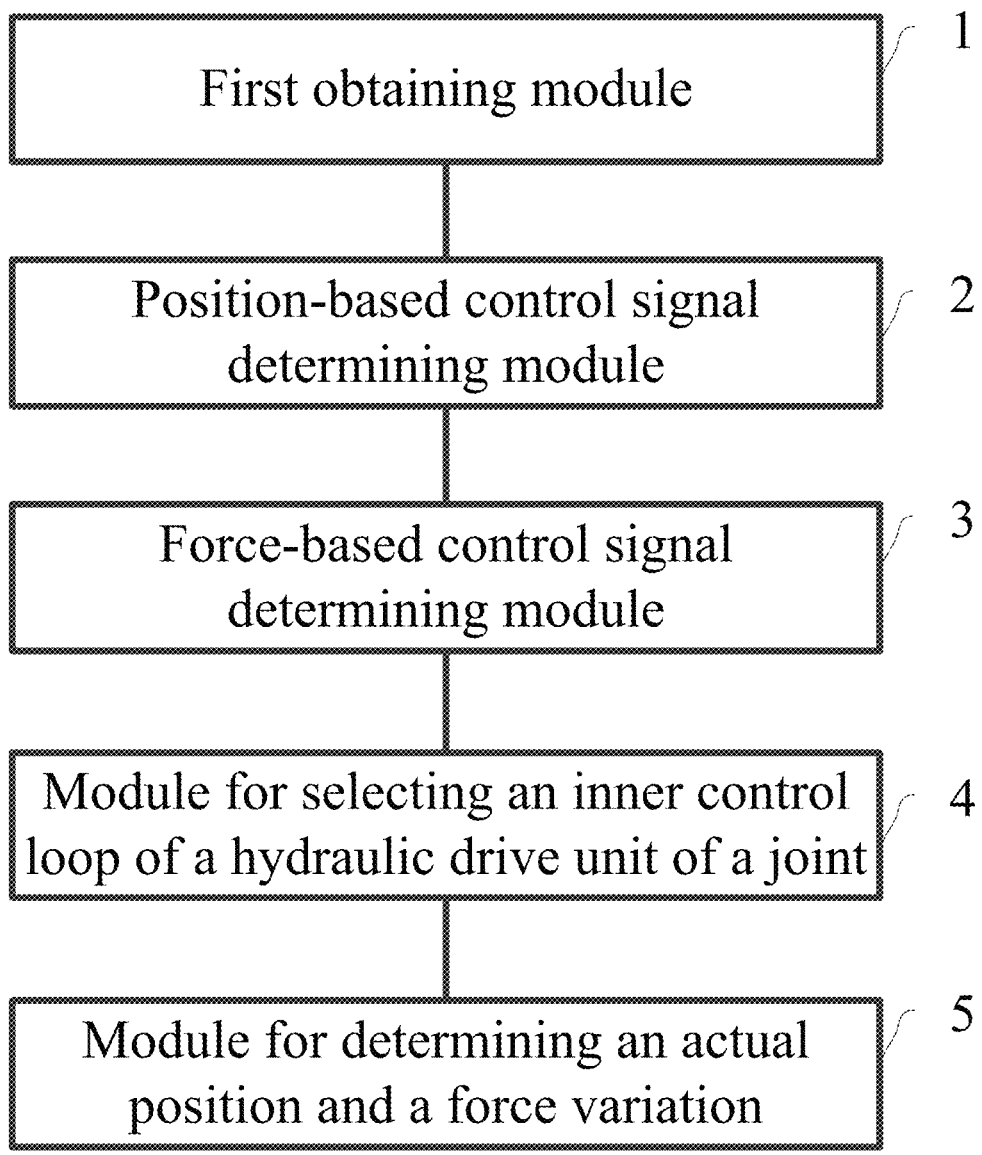

Based on Table 4, MATLAB is used to obtain a solution. The equivalent mass of the hydraulic drive unit of each joint of the leg is shown in a) to g) in FIG. 20.

In the present disclosure, the following inclusions can be obtained through analysis based on theoretical formulas and curves of the distribution of the equivalent mass of the hydraulic drive unit of each joint when the hydraulic drive system of the leg is in the swing phase state and the stance phase state:

(1) When the hydraulic drive system of the leg is in the swing phase state, the equivalent mass of the hydraulic drive unit of each joint of the leg within the motion space of the foot satisfies the following relationship: equivalent mass of the hydraulic drive unit of the knee joint>equivalent mass of the hydraulic drive unit of the hip joint>equivalent mass of the hydraulic drive unit of the ankle joint.

(2) When the hydraulic drive system of the leg is in the stance phase state, no matter how the centroid position and the mass of the base member change, the equivalent mass of the hydraulic drive unit of each joint within most of the motion space of the foot satisfies the following relationship: equivalent mass of the hydraulic drive unit of the ankle joint>equivalent mass of the hydraulic drive unit of the knee joint>equivalent mass of the hydraulic drive unit of the hip joint.

A main objective of the present disclosure is to use a different inner-loop core control mode for each joint of the leg based on different equivalent load mass and different external disturbance characteristics of the hydraulic drive units of the hip joint, the knee joint, and the ankle joint in an actual motion process of the hydraulic drive system of the leg, to finally design a novel impedance control configuration for multiple joints of a leg. The equivalent mass has the following influence on the inner impedance control loop:

1. When position-based control is performed on the inner impedance control loop:

Load mass greatly affects performance of a position-based control system of the hydraulic drive unit. Higher inertia usually leads to a lower natural frequency of the hydraulic system. Larger equivalent mass leads to a lower natural frequency of the hydraulic system and poorer control performance of the system. In addition, a drastic change of the equivalent mass leads to poor control performance of the system because a natural frequency and a damping of the hydraulic system greatly change accordingly.

2. When force-based control is performed on the inner impedance control loop:

Load mass plays an important role in performance of a force-based control system of the hydraulic drive unit. Higher inertia usually leads to higher control bandwidth. When the hydraulic drive system of the leg of the robot is in the swing phase state, a joint close to the base usually has a heavier link than a joint far away from the base. Therefore, the joint close to the base usually has better force tracking performance than the joint far away from the base.

Based on the distribution of the equivalent mass of the hydraulic drive unit of each joint within the motion space of the foot in the swing phase state and the stance phase state, and the influence of the distribution of the equivalent mass on the impedance control performance of the hydraulic drive unit of the joint, the following inner-loop control modes is selected for various joints in the hydraulic drive system of the leg to improve impedance control performance of the hydraulic drive system of the leg:

1. The hip joint is closer to the base member relative to the other joints. According to a kinematics formula and a simulation analysis result, relative to the other joints, a position change of the hydraulic drive unit of the hip joint results in a larger foot variation. Therefore, to improve control precision of the foot, it is more important to ensure position-based control precision of the hip joint. In addition, when the hydraulic drive system of the leg is in the stance phase state, the hip joint has minimum equivalent mass relative to the other joints, and as a result, has poorer force-based control performance than the other joints. Based on the foregoing two aspects, it is reasonable to select position-based control as an inner-loop impedance control mode for the hydraulic drive unit of the hip joint.

2. When the hydraulic drive system of the leg is in the swing phase state, maximum equivalent mass of the hydraulic drive units of the hip joint, the knee joint, and the ankle joint is 896.1710 kg, 1907.1834 kg, and 162.3234 kg respectively. The knee joint has maximum equivalent mass and best force-based control performance relative to the other joints. In addition, when the hydraulic drive system of the leg is in the stance phase state, the equivalent mass of the hydraulic drive unit of the knee joint is slightly less than that of the ankle joint and is remarkably greater than that of the hip joint. In addition, within a small part of motion space, load mass of the knee joint is greater than that of the ankle joint. Based on the foregoing two aspects, it is reasonable to select force-based control as an inner-loop impedance control mode for the hydraulic drive unit of the knee joint.

3. When the hydraulic drive system of the leg is in the stance phase state, the foot is in contact with the ground, and the base member rotates relative to the foot to push the robot to move forward. In this case, the ankle joint is closer to the foot relative to the other joints. Therefore, tracking precision of the hydraulic drive unit of the ankle joint plays a more important role in improving motion precision of the robot when the leg of the robot is in a support-phase state. In addition, within most of the motion space of the foot (including motion trajectories of most gaits of the robot), the ankle joint has maximum equivalent mass and best force-based control performance relative to the other joints. Based on the foregoing two aspects, it is reasonable to select force-based control as an inner-loop impedance control mode for the hydraulic drive unit of the ankle joint.

In conclusion, in Table 2, the sixth scheme (performing position-based control on the hip joint, and force-based control on the knee joint and the ankle joint) has better control performance than the other seven schemes, and is an optimal impedance configuration for the hydraulic drive system of the leg.

Each embodiment of this specification is described in a progressive manner, each embodiment focuses on the difference from other embodiments, and the same and similar parts between the embodiments may refer to each other. For the system disclosed in the embodiment, since it corresponds to the method disclosed in the embodiment, the description of the system is relatively simple, and the relevant information can be referred to the description of the method.

In this specification, one example is used for illustration of the principles and implementations of the present disclosure. The description of the foregoing embodiments is merely used to help illustrate the method of the present disclosure and the core principles thereof. In addition, those of ordinary skill in the art can make various modifications in terms of specific implementations and a scope of application in accordance with the teachings of the present disclosure. In conclusion, the content of this specification shall not be construed as a limitation to the present disclosure.

What is claimed is:

1. A method for generating a novel impedance configuration for a three-degree-of-freedom (3DOF) robotic leg, comprising:
    obtaining a mathematical model of a hydraulic drive system of the leg of a to-be-controlled robot, wherein the mathematical model comprises a leg kinematics model, a leg statics model, a leg dynamics model, a leg impedance characteristic model, a mapping between an elongation of a hydraulic drive unit of each joint of the leg and a rotation angle of each joint of the leg, and a mapping among force applied to the hydraulic drive unit of each joint, the rotation angle of each joint, and a torque of each joint; and wherein the leg comprises a hip joint, a knee joint, and an ankle joint;
    determining, when a disturbing force is applied to a foot of the to-be-controlled robot, a variation of an input signal of an inner position-based control loop of a hydraulic drive unit of each joint based on the mathematical model;
    determining, when the foot is in a disturbed position, a variation of an input signal of an inner force-based control loop of the hydraulic drive unit of each joint based on the mathematical model;
    generating the novel impedance configuration in which position-based control is performed on an inner control loop of a hydraulic drive unit of the hip joint, and force-based control is performed on inner control loops of hydraulic drive units of the knee joint and the ankle joint, and using a servo valve to obtain output positions and output force of the hydraulic drive units of the hip joint, the knee joint, and the ankle joint; and
    based on the output positions and the output force of the hydraulic drive units of the hip joint, the knee joint, and the ankle joint, performing forward calculation by using the leg kinematics model, the leg statics model, the mapping between the elongation of the hydraulic drive unit of each joint and the rotation angle of each joint, and the mapping among the force applied to the hydraulic drive unit of each joint, the rotation angle of each joint, and the torque of each joint, to obtain an actual position and a force variation of the foot of the leg.

2. The method for generating a novel impedance configuration for a 3DOF robotic leg according to claim 1, wherein before the obtaining a mathematical model of a hydraulic drive system of the leg of a to-be-controlled robot, the method further comprises:
    obtaining a length of each member in the hydraulic drive system of the leg of the to-be-controlled robot, the rotation angle of each joint, and the torque of each joint, wherein a thigh member, a crus member, and a foot member are comprised;
    constructing the leg kinematics model based on the length of each member and the rotation angle of each joint;
    constructing the leg statics model based on the length of each member, the rotation angle of each joint, and the torque of each joint; and
    constructing the leg dynamics model based on a Lagrangian dynamics equation.

3. The method for generating a novel impedance configuration for a 3DOF robotic leg according to claim 1, wherein, when the disturbing force is applied to the foot of the to-be-controlled robot, the determining a variation of an input signal of an inner position-based control loop of the hydraulic drive unit of each joint based on the mathematical model specifically comprises:
    when the disturbing force is applied to the foot of the to-be-controlled robot, detecting, by a force sensor of the hydraulic drive unit of each joint, a force signal, performing inverse calculation by using the leg dynamics model, to obtain a disturbing force component of the foot in the signal detected by the force sensor of the hydraulic drive unit of each point, and performing forward calculation by using the leg statics model, the mapping between the elongation of the hydraulic drive unit of each joint and the rotation angle of each joint, and the mapping among the force applied to the hydraulic drive unit of each joint, the rotation angle of each joint, and the torque of each joint, to obtain the disturbing force applied to the foot;
    using a leg impedance characteristic solver to obtain a foot position variation corresponding to the disturbing force applied to the foot; and
    performing inverse calculation based on the foot position variation by using the leg kinematics model and the mapping between the elongation of the hydraulic drive unit of each joint and the rotation angle of each joint, to obtain the variation of the input signal of the inner position-based control loop of the hydraulic drive unit of each joint.

4. The method for generating a novel impedance configuration for a 3DOF robotic leg according to claim 1, wherein, when the foot is in the disturbed position, the determining a variation of an input signal of an inner force-based control loop of the hydraulic drive unit of each joint based on the mathematical model specifically comprises:
    when the foot is in the disturbed position, detecting, by a position sensor of the hydraulic drive unit of each joint, a position signal, and then performing forward calculation by using the leg kinematics model and the mapping between the elongation of the hydraulic drive unit of each joint and the rotation angle of each joint, to obtain a position signal of the foot, wherein the position signal of the foot comprises an input position of the foot and the actual position of the foot;

obtaining a desired outer-loop position of the foot based on the position signal of the foot; and converting the desired outer-loop position of the foot into a corresponding desired force signal of foot impedance by using a leg impedance characteristic solver, and performing inverse calculation on the desired force signal of the foot impedance by using the leg statics model, the mapping between the elongation of the hydraulic drive unit of each joint and the rotation angle of each joint, and the mapping among the force applied to the hydraulic drive unit of each point, the rotation angle of each joint, and the torque of each joint, to obtain the variation of the input signal of the inner force-based control loop of the hydraulic drive unit of each joint.

\* \* \* \* \*